United States Patent
Ghaderi et al.

(10) Patent No.: US 12,525,030 B1
(45) Date of Patent: Jan. 13, 2026

(54) FLASHING TRAFFIC LIGHT STATE DETECTION

(71) Applicant: Zoox, Inc., Foster City, CA (US)

(72) Inventors: Amir Ghaderi, San Jose, CA (US);
Shuangyu Li, Cupertino, CA (US);
Derek Xiang Ma, San Carlos, CA (US); Oytun Ulutan, Buena Park, CA (US)

(73) Assignee: Zoox, Inc., Foster City, CA (US)

( * ) Notice: Subject to any disclaimer, the term of this patent is extended or adjusted under 35 U.S.C. 154(b) by 470 days.

(21) Appl. No.: 17/844,539

(22) Filed: Jun. 20, 2022

(51) Int. Cl.
| | |
|---|---|
| *G06V 10/764* | (2022.01) |
| *B60W 60/00* | (2020.01) |
| *G06V 10/62* | (2022.01) |
| *G06V 10/82* | (2022.01) |
| *G06V 20/58* | (2022.01) |

(52) U.S. Cl.
CPC ....... *G06V 20/584* (2022.01); *B60W 60/0015* (2020.02); *G06V 10/62* (2022.01); *G06V 10/764* (2022.01); *G06V 10/82* (2022.01); *B60W 2420/403* (2013.01); *B60W 2555/60* (2020.02)

(58) Field of Classification Search
None
See application file for complete search history.

(56) References Cited

U.S. PATENT DOCUMENTS

| | | | |
|---|---|---|---|
| 8,725,412 | B2 | 5/2014 | Kobori et al. |
| 9,507,346 | B1 * | 11/2016 | Levinson ............ G06F 3/04847 |
| 10,339,400 | B1 | 7/2019 | Wang et al. |
| 10,467,487 | B1 | 11/2019 | Wang et al. |
| 11,056,005 | B2 * | 7/2021 | Krivokon ............. G06V 20/584 |
| 11,087,153 | B2 * | 8/2021 | Vishal ................. G06F 18/2115 |
| 2004/0143380 | A1 * | 7/2004 | Stam ....................... H05B 47/17 |
| | | | 340/467 |
| 2014/0369058 | A1 | 12/2014 | Foltin et al. |
| 2015/0138324 | A1 * | 5/2015 | Shirai .................. H04N 13/296 |
| | | | 348/47 |
| 2017/0024622 | A1 | 1/2017 | Mizutani et al. |
| 2017/0103275 | A1 | 4/2017 | Yamanoi et al. |
| 2018/0211530 | A1 * | 7/2018 | Sarkar .................. G06V 20/584 |
| 2019/0092318 | A1 * | 3/2019 | Mei ........................... G06N 3/04 |

(Continued)

FOREIGN PATENT DOCUMENTS

WO    WO-2018026603 A1 *   2/2018   ........ B60W 60/0015

OTHER PUBLICATIONS

United States Non-Final Office Action dated Sep. 25, 2024 for U.S. Appl. No. 17/844,548.

(Continued)

*Primary Examiner* — Tsung Yin Tsai
(74) *Attorney, Agent, or Firm* — EIP US LLP

(57) ABSTRACT

Techniques are described herein for determining whether a traffic light signal is flashing. The technique comprises collating data representing a time-ordered sequence of classifications indicative of a likelihood that a traffic light signal is active at respective times, thereby to create collated data. output data is generated, based on the collated data, using a convolutional neural network (CNN) arranged to provide an indication of a likelihood that a traffic light signal is flashing based on an input time-ordered sequence of classifications. It is then determined whether the traffic light signal is flashing based on the output data.

19 Claims, 11 Drawing Sheets

(56) References Cited

U.S. PATENT DOCUMENTS

| | | |
|---|---|---|
| 2019/0258251 A1 | 8/2019 | Ditty et al. |
| 2019/0332875 A1* | 10/2019 | Vallespi-Gonzalez ........................ G06F 18/217 |
| 2020/0133283 A1 | 4/2020 | Hirano et al. |
| 2020/0134333 A1* | 4/2020 | Vishal ................. G06F 18/2451 |
| 2020/0135030 A1* | 4/2020 | Krivokon ............... G08G 1/167 |
| 2021/0004011 A1 | 1/2021 | Oh |
| 2021/0027076 A1 | 1/2021 | Hayashi et al. |
| 2021/0097855 A1* | 4/2021 | Annapureddy ...... G06V 20/588 |
| 2021/0390349 A1* | 12/2021 | Hotson .............. G06V 10/7753 |
| 2022/0297726 A1* | 9/2022 | Zhang ................. G01C 21/3453 |
| 2022/0383745 A1* | 12/2022 | Heilbron .............. G06V 20/582 |
| 2023/0073038 A1 | 3/2023 | Madan et al. |

OTHER PUBLICATIONS

"EnsembleVoteClassifier" by Sebastian Raschka, published on Github Mar. 2021 (Year: 2021).

United States Final Office Action dated Apr. 16, 2025 for U.S. Appl. No. 17/844,547.

United States Non-Final Office Action dated Dec. 31, 2024 for U.S. Appl. No. 17/844,547.

"CarMaker Tips & Tricks—Detect Traffic Lights", by Leo Heinz, IPG Solutions Engineering, Oct. 30, 2019 (Year: 2019).

* cited by examiner

FLASHING TRAFFIC LIGHT STATE DETECTION

BACKGROUND

Traffic lights are signaling devices located at, or near, road intersections, pedestrian crossings, rail crossings, and other locations to control a flow of traffic. Their signals indicate whether it is permissible to travel along a particular route and therefore help to improve safety on the road. Many traffic lights comprise stop and go signals, and may include additional signals relating to other control operations. Accurate detection and compliance with traffic light signals is important in the control of a road vehicle.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
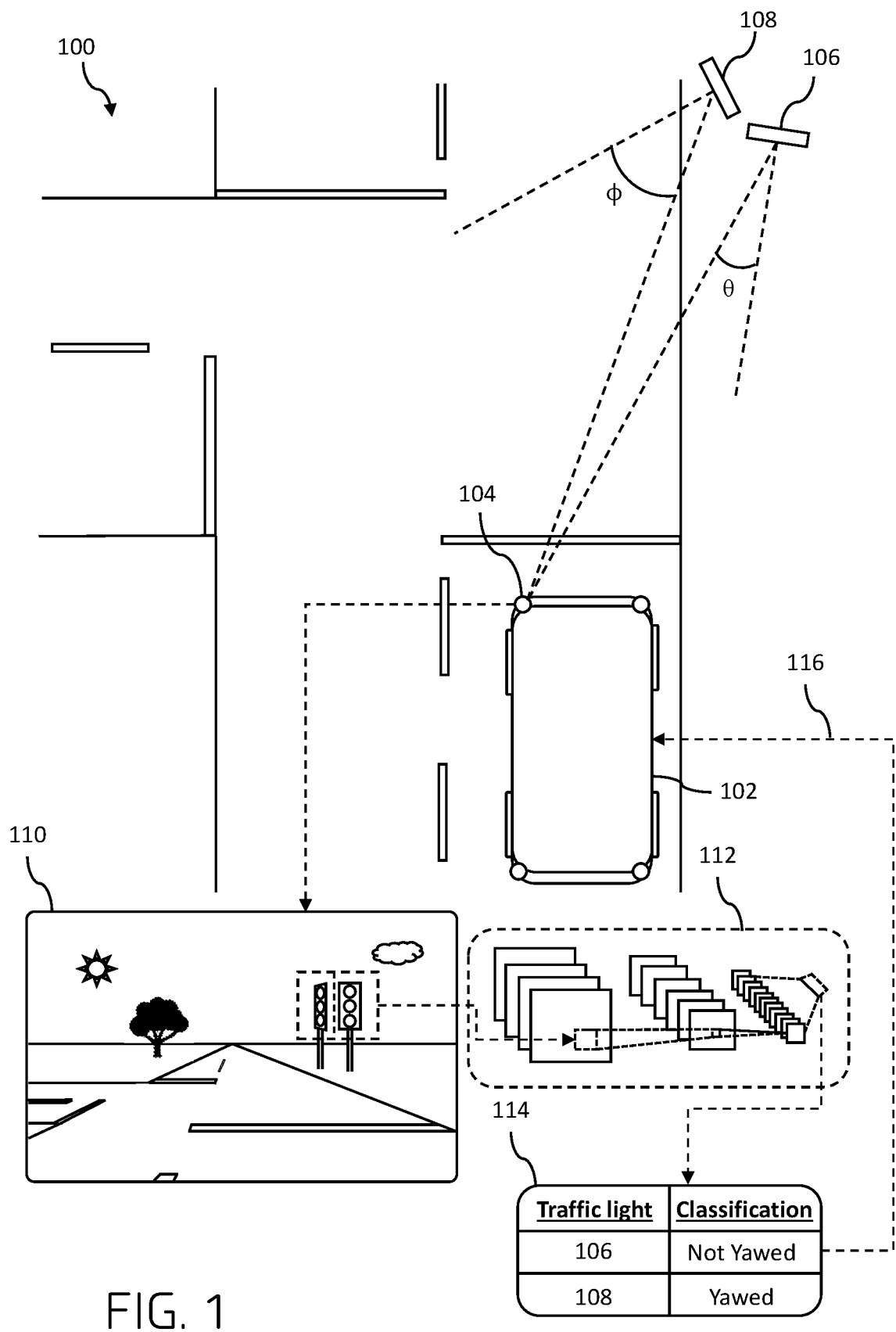
FIG. 1 is an example scenario including a vehicle.

This disclosure describes procedures, as well as methods, systems and computer-readable media for the classification of traffic light signals and their respective signals. Such procedures may be useful in various systems, including autonomous vehicles where it is important to determine permissible directions of travel as they move through the environment.

Traffic lights are common, and their signals are easily perceived and understood by human operators of vehicles. For example, a stop signal informs vehicles to stop, perhaps at a junction associated with the signal. Another example is an arrow signal at a junction allowing several directions of travel. The arrow corresponds to a particular direction of travel and the signal provides an indication of whether it is permissible to proceed along that direction. Other examples include flashing traffic light signals which could correspond to a number of control operations. For example, a flashing red signal may indicate the same function as a "Stop" sign, requiring vehicles to stop and only proceed when safe to do so while observing the right of way rules.

Certain vehicles, such as fully or semi-autonomous vehicles, may employ techniques to detect and classify traffic light signals with no, or minimal, input from a driver. It is important for such vehicles to accurately determine which traffic lights and signals are relevant to an intended direction of travel, their associated meaning, and to determine which of those signals are currently active. A vehicle may comprise one or more sensors or at least be associated with one or more sensors. For example, the one or more sensors may be distributed amongst several vehicles and/or located in proximity to the vehicle and/or traffic light. The sensor(s) may be configured to capture information relating to the traffic light. In examples, the sensor is a camera and the information may be an image of a scene comprising the traffic light. In other examples, the information may be captured by one or more other types of sensor capable of identifying a state of a traffic light head, such as a LIDAR sensor. The information can be processed to classify the traffic light and/or its signals according to the present disclosure.

As used herein, a "traffic light" comprises at least one "traffic light head". The traffic light head comprises at least one "traffic light signal" indicative of a control command that is to be obeyed by vehicles on the road (e.g., a light selectively illuminated green, yellow, or red). A traffic light may have a single traffic light head, other examples may comprise at least two traffic light heads, such as to provide redundancy of the signals.

In examples of the present disclosure, yaw of a traffic light head is considered. Information may be processed to determine a yaw value indicative of whether the traffic light head is yawed with respect to a line of sight of a sensor used to generate the information. Yaw is understood to refer to a rotation about an axis substantially perpendicular to the ground, also referred to as a vertical axis. It can be thought of as a measure of how aligned a face of the traffic light head is with the line of sight of the sensor. In this disclosure, a yaw angle of zero corresponds to the situation wherein the face of the traffic light head comprising signals is head on to a sensor, or directly in line of sight with a sensor. In other words, a front face of the traffic light head including traffic light signal(s) is substantially perpendicular to a line of sight to a corresponding sensor.

A maximum amount of yaw corresponds to the situation wherein the face of the traffic light head comprising signals faces in the same direction as the sensor. In other words, the face of the traffic light head comprising signals faces completely away from the line of sight of the sensor. Put another way, as yaw is a measure of rotation it will wrap around back to zero after a complete rotation of 360° and is at its maximum at a rotation of 180°. Yaw may be expressed in some examples as a positive/negative value, where a positive value is a clockwise rotation and a negative value is an anticlockwise rotation. For example a value of +1° is equivalent to a value of −359°. Some examples may express the yaw angle in the range −180° to 180° so that an absolute value of the yaw angle indicates how aligned the front face of the traffic light head is.

The amount of yaw may also depend on the direction faced by the sensor. Consider a situation wherein a traffic light head is positioned far from the center of a field of view of the sensor, although still within the field of view. Even if the traffic light head faced the sensor, the traffic light head may appear yawed in the information generated by the sensor. Calibration of the sensor may be performed to minimize this yaw due to the relative rotation of the sensor, for example by correctly determining the pose of the sensor in relation to the world.

Based on the yaw value, it may be determined whether the traffic light corresponds to a direction of travel of the vehicle through a junction, intersection, or other road feature associated with the traffic light head. This determination may be used to determine whether a traffic light is relevant to the vehicle and to what extent it should be obeyed. When multiple traffic light heads are present, this yaw value may also help to disambiguate the correct traffic light head from several possible candidate traffic light heads. In general, for sensors facing in a forward direction relative to the vehicle, it is more likely that a traffic light head relevant to the vehicle is one with less yaw. For example, at a three-way intersection, multiple traffic light heads may be present facing in different directions to control the flow of traffic through the intersection by instructing traffic coming into the intersection from different directions. A subset of less than all of the multiple traffic light heads may be relevant to the vehicle for a given route or trajectory that the vehicle intends to follow, and so it is important to correctly disambiguate the relevant traffic light head(s) from the non-relevant traffic light head(s).

The determination of whether the traffic light head is relevant to the vehicle using the yaw value may then be used to generate instructions to control the vehicle. For example, in the scenario in which the yaw value informs a determination that the traffic light head is relevant to a vehicle's direction of travel, and it is determined that a stop signal is active on the traffic light head, instructions may be generated that cause the vehicle to come to a stop.

In some examples, the yaw value is determined from one or more machine learning algorithms. An example machine learning algorithm comprises a convolutional neural network (CNN) trained to classify training image data to give an output indicate of a degree of yaw or likelihood that the yaw exceeds a threshold. Another example machine learning algorithm comprises a convolutional neural network (CNN) trained to classify training sensor data into a plurality of classes. At least one of the classes corresponds to traffic light heads that are yawed and at least one other class corresponds to traffic light heads that are considered not yawed.

The yaw value may indicate whether the yaw angle is above a predetermined threshold angle. For example, traffic light heads having with a yaw angle above the predetermined threshold angle may be classified as "yawed" and traffic light heads having a yaw angle below the predetermined angle may be classified as "not yawed". Such a binary classification may assist in improving the accuracy of a permissibility estimation for traffic light signals. This also simplifies training of the machine learning algorithm(s) as the ground truth training data only needs to include an indication of whether the traffic light is yawed rather than include an indication of an exact yaw angle. Example predetermined threshold angles include 20°, 25°, 30°, 35°, 40° and 45°. A high yaw angle may be an indication that the traffic light is not relevant to the vehicle. In other examples, the yaw value may indicate an approximate yaw angle of the traffic light head with respect to a line of sight of the sensor. Rather than a binary classification, a plurality of classifications, or even a regression, may be provided. In all cases, the determination of a yaw amount can improve the accuracy of the permissibility estimation for the traffic light signals, particularly when more than two traffic light heads are present at very similar positions. For example, approximate yaw angles of traffic light heads may be compared in order to provide an indication of which of the traffic light heads are relevant. It will be appreciated that the yaw value is determined by how the machine learning algorithm is trained. For example, the training data may associate training images with one of a binary classification, one of a plurality of classifications, or a continuum.

In general, the information generated by the sensor(s) can be used to provide indications that particular ones of the signals on a traffic light head are active. The indications may be a binary classification corresponding to "active" or "not active" states. In other examples, the indications may be probabilities that the signals are active. In yet other examples, the indications may define the signal that is determined to be active on the traffic light head. These indications may be determined using a further machine learning algorithm, examples of which are discussed further below.

In the case where a plurality of traffic light heads are present in the vicinity of the vehicle (for example they plurality of traffic light heads appear in the information generated by the sensor simultaneously), the indications for the signals of each traffic light head can be weighted by a factor associated with the respective yaw value. The weighted indications may be used to determine which signal is permissible, by for example, selecting the signal having the highest weighted indication.

In further examples, map data indicating pose information of a traffic light head may be obtained. The pose information may include up to six degrees of freedom, such as one or more of an x-coordinate, a y-coordinate, a z-coordinate (or any coordinate of any coordinate system, including polar or cylindrical coordinate systems, or the like), a yaw value, a roll value, a pitch value (e.g., an angle value) and the like. The map data may therefore be used to determine an expected position of the traffic light head with respect to the information generated by the sensor. The expected position may also consider a direction of travel so that traffic light heads associated with the direction of travel are considered. This may be useful when the information is an image comprising several traffic light heads. The map data may be used to overlay an expected location of the traffic light head onto the image. Nevertheless, when the several traffic light heads are positioned such that they appear close in the image, it may be challenging to disambiguate which of the imaged traffic light heads is the traffic light head that should be obeyed considering the vehicle's direction of travel. As discussed above, determining which traffic light head is relevant may involve determining how yawed each of the traffic light heads are in addition to the use of map data.

In some situations using map data, there may be spurious active signal indications when the relevant traffic light head is located close to the expected position but appears yawed. To combat this, respective distances between traffic light heads and the expected position of the traffic light head may be determined. These distances may be weighted by a factor associated with the yaw value such that traffic light heads with yaw value indicating that a traffic light head is yawed can be reduced or suppressed. In further examples, a combination of distance and yaw may be considered in the identification of a correct traffic light head. For instance, individual thresholds associated with the distance and yaw may need to be met in order to determine a traffic light head as associated with a direction of travel. This may improve the identification of a traffic light head when the expected location of the traffic light head differs, perhaps due to the traffic light being moved or failing.

Further, expected locations of traffic light heads obtained via map data may be used to disambiguate a subset, or group, of all the traffic light heads at a junction that are associated with the direction of travel. Determining an amount of yaw of each of the traffic light heads may improve the identification of the correct traffic light heads for the direction of travel.

In examples of the present disclosure, voting is used to give improved confidence in the determination of an active signal. Information generated by one or more sensors may correspond to a plurality of traffic light heads and processing may involve determining which of the signals amongst the plurality of traffic light signals are active on each traffic light head. Several factors may influence whether a traffic light signal appears active. These include environmental factors such as glare from the sun which may cause an inactive signal to appear active, or an obstruction at least partially blocking a signal which may cause an active signal to appear inactive.

A machine learning algorithm may be used to determine an indication of whether the each of the signals present in the plurality of traffic lights are active. The indication may take various forms, such as a binary classification comprising the states "active" and "inactive", a probability that the respective signal is active, or an indication of the state of the traffic light head (red, yellow, green, green arrow etc.). The machine learning algorithm may be trained to classify the information into one of a plurality of classes corresponding to the different indications. The machine learning algorithm may be a CNN.

It can then be determined which of the signals are active on each of the traffic light heads based on the indications from the machine learning algorithm. This may involve selecting the signal having the highest indication (or greatest probability of being active) on each traffic light head. In some examples, prior to determining which of the signals are active, the indication(s) may be adjusted to prioritize one or more signals of the plurality of traffic light heads. For example, a stop signal may be prioritized over all other signals for safety reasons. Prioritizing may involve applying a weighting based on the signal, for example so that a "stop" signal is weighted more highly than a "go" signal. It should be understood that an output of a machine-learned model could include multiple signal classifications for a traffic light head each with a respective confidence value. These confidence values may be augmented to accomplish to the aforementioned weighting. Additionally, or alternatively, indications corresponding to non-prioritized signals may be reduced in weighting compared to indications of prioritized signals. In an example, the weighting may involve adjusting the indications such that a stop signal having at least a 50% probability of being active will be determined to be active, even if an unadjusted indication of another signal is higher than the unadjusted indication for the stop signal. In further examples, the indication for a signal may be weighted by a factor associated with a yaw classification of the traffic light head comprising the signal, as discussed above (e.g., a confidence or probability score may be increased if the yaw score is indicative of the traffic light head facing the sensor).

In a first example, a single signal may be determined to be active on each of the traffic light heads. In a second example, at least two signals may be determined to be active on each of the traffic light heads, such as when an arrow indicating that traffic may proceed along a certain route is active at the same time as a stop signal indicating that traffic intending to proceed along another route must stop.

The total number of signals on each traffic light head can be determined from map data or determined in real time, using a machine learning algorithm for example. Rarer signals, such as arrow signals, may be treated as if they belong to the traffic light head on which they are displayable or treated as though they belong to their own traffic light head.

A vote may be allocated, or assigned, to each of the signals determined to be active. The votes are then accumulated for each of the signals and it may be determined which of the signals are active based on the accumulated votes. When only one signal may be determined to be active, this may involve selecting the signal having the highest number of votes across the plurality of traffic light heads. When two or more signals may be active at a time, this may involve selecting the signals having a number of votes above a predetermined threshold number of votes. Determining that two or more signals are active may also consider allowable states of signals on a traffic light head. For example, a red ("stop") signal and a green arrow is possible but a red ("stop") signal and a general green ("go") signal is not possible, unless the traffic light head is malfunctioning.

Indications and votes may be considered only for signals corresponding to an intended direction of travel of the vehicle. An autonomous vehicle typically knows which direction it should take through a junction in order to reach its destination. In some examples, at least one traffic light of the plurality of traffic lights may be ignored if it can be determined that the at least one traffic light does not correspond to an intended direction of travel. Ignoring traffic light signals known not to be relevant to the vehicle can improve the voting scheme by focusing on only signals that are relevant. Similar logic applies to individual signals. For example, an arrow signal associated with a turn may be ignored if it does not correspond to an intended direction of travel.

Prior to allocating votes, a subset, or group, of traffic light heads from the plurality of traffic light heads may be identified as associated with an intended direction of travel through the junction. This may be achieved based on a known number of relevant traffic light heads at the junction for that particular direction of travel. For example, map data may comprise an indication of this number of traffic light heads, as well as their relative positions. Indications such as distance between expected location (based on the map data) and actual location, and yaw of the traffic light heads may then be used to identify the relevant subset of traffic light heads. This determination may also be performed without the use of map data, based on sensor data captured in real time. Indications such as the likelihood that signals are active and yaw can be used to determine whether a traffic light head is relevant to the intended direction of trave and therefore whether it is to be identified in the subset of traffic light heads. Identifying the subset of traffic light heads may therefore be performed prior to, or after, classifying signals on the traffic light heads.

In some examples, a rate may be calculated based on a number of votes for a signal divided by the total number of traffic light heads in the plurality of traffic lights on which the signal is displayable. The rates for each signal of the plurality of traffic lights may be compared to determine which of the signals are active. In some cases, the signal having the highest rate may be selected as the signal determined to be active. In some other cases, a predetermined number of signals having the highest rates may be selected as the signals determined to be active. In yet other cases, all of those signals having a rate above a predetermined threshold rate may be determined to be active.

Voting schemas can improve the accuracy of traffic light signal group permissibility determination by using the redundancy provided by multiple traffic heads. This may reduce the impact of false classification of individual traffic signals (e.g., a single false positive is less like to skew the group estimation). The voting scheme may also improve signal identification in the scenarios involving signals that might not appear on all traffic light heads, such as arrow signals.

Detection of the plurality of traffic lights for use in the voting can be improved by obtaining map data indicating known locations of traffic light heads. By associating the map data with data generated by one or more positioning sensing systems associated with the vehicle, it can be determined when and where the plurality of traffic light heads can be expected to appear. This may be used in conjunction with the information generated by the sensor(s) to identify the plurality of traffic light heads.

The one or more signals of the group of traffic light heads that are determined to be active may be used to generate instructions to control the vehicle, such as to control whether the vehicle stops or proceeds through a junction.

Examples of the present disclosure involve determining whether a traffic light signal is flashing. Information generated by one or more sensors may be processed into a time-ordered sequence of traffic light classifications indicating whether a traffic light signal is active at respective times. This sequence can be processed to provide an indication of whether the signal of the traffic light is flashing.

Perception information can be captured, determined or generated at respective different times for traffic light signals. The perception information may include images captured by one or more cameras, and/or other data that is captured by one or more different sensors. Each image may comprise an indication associating the image to a respective time of capture. This indication may comprise a timestamp or other indications of an ordering of the image with respect to the other images/data. The perception information may be stored non-linearly. For example, the information may be pushed onto a stack as soon as it is generated. The indications associating the information to a respective time of capture may be used to assemble the images/data into a time ordered sequence.

The perception information, possibly time-ordered, may be processed as discussed above to determine an indication/classification of the likelihood that the signal is active at the respective times, for example by using a neural network. As discussed above, the indications/classifications may be probabilities that a signal is active at a respective time. If not already, the classifications may then be time-ordered to generate the time-ordered sequence of classifications, by inspecting the respective indications associating each of the classifications (or associated perception information) to the respective times.

The time-ordered sequence of classifications may be input into a machine learning algorithm, trained to identify whether the signal is flashing. The machine learning algorithm may be a CNN. CNNs are typically used to process image data, as referred to above, due to their ability to resolve, identify and classify spatial features. In this example, a CNN is instead used to resolve temporal features in a time-ordered sequence of data to determine whether the time-ordered sequence of data is indicative of a flashing traffic light signal. For example, one-dimensional data such as a list of probabilities that particular signals are active on a traffic light head, may be collated into a two-dimensional set of probabilities, which is then processed by the CNN. The CNN may therefore process the time-ordered sequence of data in parallel.

CNNs allow multiple channels of data to be classified at a time. In examples, time-ordered sequences of classifications for each signal of a traffic light may be aggregated. An example would be the aggregation of time-ordered sequences corresponding to red, yellow and green signals. The aggregated data may be input into the CNN as input data comprising a plurality of channels. Such examples may be more efficient by adapting techniques for classification of color images.

The CNN may be configured to receive input data of a fixed size. Temporal data as generated by the one or more sensors of a vehicle may not be of a fixed length and/or correspond to a fixed time window. To improve the accuracy of the flashing signal classification, it may be advantageous for contiguous classifications in the sequence to be approximately equally spaced, such as around 100 ms apart, other intervals may also be used. To achieve this, it may be determined that a time period between contiguous classifications in the sequence is above a predetermined threshold. This may correspond to the sensor not generating any data at a particular time, perhaps because the signal is inactive. The predetermined threshold may be around 100 ms. In response, a third classification may be inserted into the sequence having a timestamp between the contiguous classifications. The third classification may indicate that the traffic light signal is inactive. This can assist in improving safety.

If it is determined that a time period between contiguous classifications in the sequence is below a predetermined threshold, one of the contiguous classifications may be removed, discarded or otherwise deleted from the sequence because it may not markedly improve the accuracy of the model. In some examples, a choice of which classification to remove within close temporal proximity may be made based on a confidence value and/or a similarity between the current classification sensor originator and other classifications, for example. In some cases, the later of the classifications may be removed. Contiguous classifications below the predetermined threshold may have no additional advantage in the determination of whether the traffic light signal is flashing and so may be discarded without reducing accuracy while improving efficiency. A spacing of around 100 ms has been found to give a good balance between accuracy and computational complexity in some examples.

It may be further advantageous for the time-ordered sequence to have a length corresponding to a predetermined time period or time window in which the traffic light signal cycles between active and inactive states at least two times. In some cases, the time period may correspond to a period in which the traffic light signal cycles between active and inactive states up to three times. Accuracy can be improved by lengthening the time period so that the likelihood of detecting a flashing signal is increased. Response time can be improved by shortening the time window so that fewer observations are required to determine a flashing signal. A time window corresponding to a length of time required for a traffic light signal to flash around two or three times has been shown to provide a good balance for accuracy and response time. This may correspond to around 2 seconds, 2.5 seconds or 3 seconds.

The time-ordered sequence of classifications may alternatively, or additionally, be transformed into the frequency domain using any suitable technique, such as by performing a discrete Fourier Transform (DFT) or fast Fourier Transform (FFT) on the sequence. The resulting frequency data may be processed to identify whether the signal is flashing. In an example, the processing may involve inputting the frequency data into a CNN. The ability of a CNN in resolving features in data can be used to determine whether the frequency data is indicative of a flashing traffic light signal.

In another example, the frequency data may be processed to identify peaks in the data around the frequencies at which traffic light signals are expected. For example, peaks around the expected frequency of a flashing signal and above a threshold amplitude/power may indicate that the traffic light signal is flashing. The processing of the frequency data may be performed instead of, or in addition to, the processing of the time-ordered sequence of classifications, to determine whether a traffic light signal is flashing.

There may be additional classification processes involved in the detection and identification of traffic light signals. In some cases, there may be additional processing to determine which of the traffic light signals at a junction are active, irrespective of whether they are flashing or not. In an example, it may be determined that a go signal is active using this additional processing, and also that a stop light is flashing. In this case, the flashing stop light may be prioritized over the determination that the go signal is active.

The determination of whether a traffic light signal is flashing may be used to generate instructions to control a vehicle. For example, a vehicle's perception system can use the determination to classify the traffic light so that it can be sent to a prediction and planner system which can generate control instructions for the vehicle. In an example, determining a red traffic light signal is flashing may cause a vehicle to be controlled to stop.

It will be appreciated that all of the preceding examples' features can be used in any combination with each other. For example, the determination of whether a traffic light head appears yawed may be used in the voting procedure to determine which of a plurality of traffic light signals are currently active. This may involve weighting votes for signals on yawed traffic lights such that they are less likely to be determined to be active.

In another example, the determination of whether a traffic light head appears yawed may be used to determine whether a traffic light signal on the traffic light head is flashing. A yaw classification indicating that a traffic light head is yawed may be used to a reduce a weighting of a flashing determine.

In another example, a determination that a traffic light signal is flashing may be used to determine which of a plurality of signals are currently active. In an example, a flashing signal may be designated priority over other, non-flashing signals. This may be achieved by weighting the votes and/or active signal indication of the flashing signal. A flashing traffic light signal may also be considered as a votable signal. For example, allowable signals which can be voted for include for "Red", "Yellow" and "Green" votes may also be cast for "Red Flashing" and so on.

A determination of yaw and whether a traffic light signal is flashing can be used to determine which signals amongst a plurality of signals are active before the voting.

The methods, apparatuses, and systems described herein can be implemented in a number of ways. Example implementations are provided below with reference to the following FIG.s. Although discussed in the context of an autonomous vehicle system in some examples below, the methods, apparatuses, and systems described herein can be applied to a variety of systems. Additionally, or alternatively, the techniques described herein can be used with real data (e.g., captured using sensor(s)), simulated data (e.g., generated by a simulator), or any combination thereof.

Yawed Traffic Lights

FIG. 1 illustrates an example scenario 100 including a vehicle 102 at a junction. The vehicle 102 may be an autonomous vehicle. The vehicle 102 may include a vehicle computing device and may be part of a vehicle system (not shown) that includes one or more remote computing devices. The example scenario 100 involves the vehicle 102 using a sensor 104—positioned on a front side of the vehicle and facing a forward direction of travel—to sense traffic light heads 106, 108 in the vehicle's immediate vicinity. Images obtained from the sensor 104 may be used, at least in part, to control the vehicle 102. For example, the images may be used to determine whether the vehicle 102 should stop at the junction or can proceed to travel through the junction.

In the example scenario 100, a first of the traffic light heads 106 is shown yawed at a first angle, θ, with respect to the sensor 104 and a second of the traffic light heads 108 is shown yawed at a second, larger, angle, o, with respect to the sensor 104.

Image 110 is a diagrammatic representation of the landscape in front of the vehicle 102, as detected by sensor 104. The image 110 includes the first and second traffic light heads 106, 108. An image of the traffic light head is then fed into a machine learning algorithm, here illustrated as a CNN 112. For clarity, FIG. 1 depicts how a single one of the two traffic light head is processed, the process flow is the same for both traffic light heads and can be carried out sequentially in any order or in parallel. The CNN 112 is trained to classify images of traffic light heads into a plurality of classes indicative of an amount of yaw of the traffic light head. While the image 110 is illustrated as a photograph imaging in visible light, it is understood that the sensor 104 may be arranged to generate data based on any sensing technology capable of indicating an amount of yaw of a traffic light head. For example, a thermographic (infrared) camera or LIDAR sensor could alternatively. or additionally be used.

The output 114 of the CNN 112 is a binary estimation indicative of whether a traffic light head is yawed. That is, the CNN 112 is arranged to determine whether a traffic light head is yawed above a predetermined threshold angle with respect to a line of sight of the sensor 104. In this scenario 100, the predetermined threshold angle is 25 degrees. For the scenario of FIG. 1, the output 114 of the CNN 112 indicates that the first traffic light head 106 is yawed by an angle that is less than the threshold angle, and that the second traffic light head 108 is yawed by an angle that is greater than the threshold angle. Based on this, it is determined that the first traffic light head 106 is not yawed and that the second traffic light head 108 is yawed.

This may be used to influence which of the traffic light heads 106, 108 are obeyed. For example, the image 110 may be further classified to determine which signals of the traffic light heads 106, 108 are active. The determined yaw classifications 114 may feed into this further classification by weighing the further classifications by amounts associated with the yaw classifications 114.

The output 114 of the CNN 112 may therefore be at least partially used to generate instructions to control the vehicle 102, illustrated by the dashed arrow 116. For instance, the determination that the first traffic light 106 is not yawed may be used to generate instructions in accordance with an active signal on the first traffic light 106.

Figure 2:
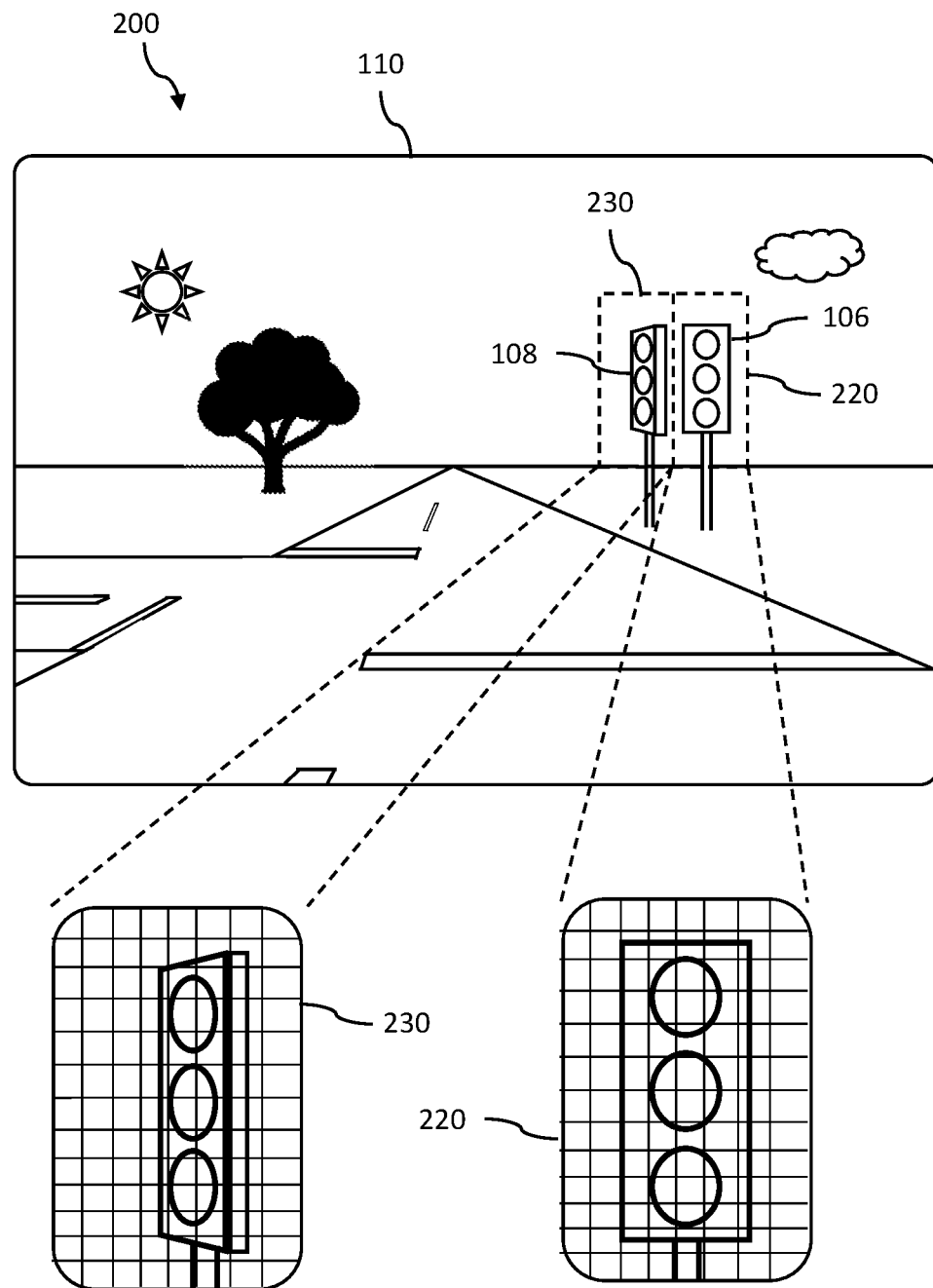
FIG. 2 is an example image that is classified by a machine learning algorithm.

FIG. 2 shows, schematically, the image 110 represented by image data that is input into the CNN 112. The image data may comprise a plurality of pixel intensity values representing a plurality of pixel locations. In the example shown in FIG. 2, the image 110 has already been partially processed, for example, using a neural network, to detect objects in the image and classify them. Detection and classification of objects in an image using a CNN is known, and the results of the detection and classification of the objects are shown in FIG. 2 with broken boxes identifying the regions of the image 220, 230 in which the traffic lights 106, 108 have been detected. These identified regions of the image 220, 230 may then be processed using the CNN 112 to identify one or more properties of the traffic light heads 106, 108. In this example, the CNN 112 is to classify whether the traffic lights 106, 108 in those regions 220, 230 are yawed.

As discussed previously, the processes illustrated in FIG. 2 may be performed on image data obtained by the sensor 104 associated with the vehicle 102. The processes may detect regions of the image data comprising any traffic light heads and separately classify the regions comprising the traffic lights into one of a plurality of classes indicative of whether the traffic light head is yawed with respect to a line of sight of the sensor 104.

The CNN 112 is trained to classify images of traffic light heads into a plurality of classes indicative of an amount of yaw of the traffic light head. In one example, the CNN 112 may be trained to generate estimation data indicative of whether the yaw angle of a traffic light is above a predetermined threshold angle. Such a binary classification provides a simple yet effective indicator that may affect operations downstream in the processing pipeline. For instance, a classification indicating a traffic light head is yawed by an angle above the threshold angle may cause the traffic light head to be ignored when it comes to determining which signals of a group of traffic light heads are active. In this way, signals on the yawed traffic light head will not influence the determination of signal permissibility. Alternatively, a traffic light head classified as yawed by an angle above the threshold angle may still be taken into account when considering signal permissibility at a junction. In this case, the influence of the yawed traffic light head may be reduced or suppressed by, for example, weighting any indications of active signals on the yawed traffic light head by a factor associated with the yaw classification.

The threshold angle may be any angle between 0 and 90 degrees. In examples, the threshold angle is between 20 and 60 degrees, such as between 20 and 30 degrees, or around 25 degrees. Such a binary classification simplifies training of the CNN 112 as the ground truth training data only needs to include an indication of whether the traffic light is "yawed" rather than include an indication of an exact yaw angle.

In another example, the CNN 112 may be trained to generate data indicative of an approximate yaw angle of the traffic light head with respect to a line of sight of the sensor 104. In particular, the CNN 112 may be trained to classify images of traffic light heads into a plurality of classes, each of the classes associated with a non-overlapping range of yaw angles, or into a continuum of classes.

Training the CNN 112 may be achieved by inputting training images of traffic lights at known yaw angles and modifying the CNN 112 based on the output. In an example, the training data may be tagged with an associated yaw angle via a human classifier. The human classifier may view a training image of a traffic light head, such as an image of a traffic light head captured by a sensor on a vehicle. The training image has an associated yaw angle but it may be difficult for the human classifier to accurately estimate the angle by simply viewing the training image. To associate the training image with a yaw angle, a simulated three-dimensional view of a traffic light may be displayed alongside the training image. The simulated three-dimensional image may be rotated about a vertical axis, or more generally a yaw axis, to match visually a yaw of the traffic light head in the training image. A yaw angle may then be associated based on the rotation of the simulated three-dimensional view. The software may allow the human classifier to rotate the simulated traffic light head, using a slider, or buttons, or the like, in order to match the yaw of the simulated traffic light head with that of the traffic light head from the training image. In this way, each image can be associated with an approximate yaw angle. Matching the yaw in this way creates suitable training data for the CNN 112. Training data associated with a yaw angle can be used for both a binary CNN (by translating the associated yaw angle into a "yawed" or "not yawed" classification) or used for CNNs with more classifications of yaw. Human classification may not be 100% accurate but can still allow the generation of training data that as a whole allows the CNN to be trained to classify traffic lights based on a yaw angle.

In another example, training data for the CNN 112 may be generated by the human classifier simply indicating whether the traffic light head in the training image is yawed above a threshold angle. This may be achieved by comparing the training image to an image of a traffic light head yawed at the threshold angle. The human classifier may then tag each traffic light head in the training images as yawed or not yawed based on the comparison.

In other examples, a human classifier may not be required. The training image data may come with an indication of an amount of yaw of a traffic light head that may have been determined when the training image data was generated. As an example, yaw data may be determined from predetermined map data and knowledge of a position and orientation of a vehicle when an image of a traffic light is captured and automatically associated with the image. For example, map data may include pose information, such as the position and orientation of traffic light heads, so that a yaw angle can be determined or otherwise estimated. This known indication may be used in conjunction with the output to adjust the parameters of the CNN using any known optimization scheme.

As briefly discussed above, the image 110 may be further classified to determine which signals of the traffic light heads 106, 108 are active. This further classification may be performed by a machine learning algorithm, such as a further CNN. Consider an example in which a further classification indicates that the go signal is active on the first traffic light head 106, and the stop signal is active on the second traffic light head 108. One technique may involve prioritizing stop signals over go signals in order to improve safety. However, this could result in a situation wherein the vehicle never proceeds through the junction; the traffic light heads control different directions of traffic flow so one of them may always be displaying a stop signal. By taking into account the yaw classifications 114, the influence of the stop signal on the second traffic light head 108 can be reduced or suppressed. In one example, the second traffic light head 108 may be ignored altogether so that the stop signal active on the second traffic light 108 is not considered. In other examples, a probability that the stop signal is active can be reduced or suppressed by weighting the probability by a factor associated with the yaw classification. This may generate a weighted probability that is smaller than the unweighted probability. In this case, a probability that the go signal is active on the first traffic light head 106 may also be determined. The effect of weighting the probability of the stop signal may cause the weighted signal to be less than the probability that the go signal is active, and so the go signal may be obeyed. Other examples are possible.

So far, yaw estimation of individual traffic light heads has been discussed with reference to obtained sensor data without additional data to assist classification. Some examples may also use predetermined information of the environment to interpret the sensor data.

In an example, map data may be obtained. The map data may identify the known locations of traffic lights with respect to a map. The map data may also identify one or more of the height, expected orientation and the type of signals displayable on the traffic lights. Data generated by a positioning sensor associated with the vehicle 102 may be compared with the map data. A processing device associated with the vehicle 102 may use the comparison to determine an expected position of a traffic light head with respect to the measurement of the more than one traffic light heads. The traffic light head whose expected position is determined may be a traffic light head that is known to correspond to a direction of travel of the vehicle and is therefore known to be relevant to the vehicle.

Figure 3:
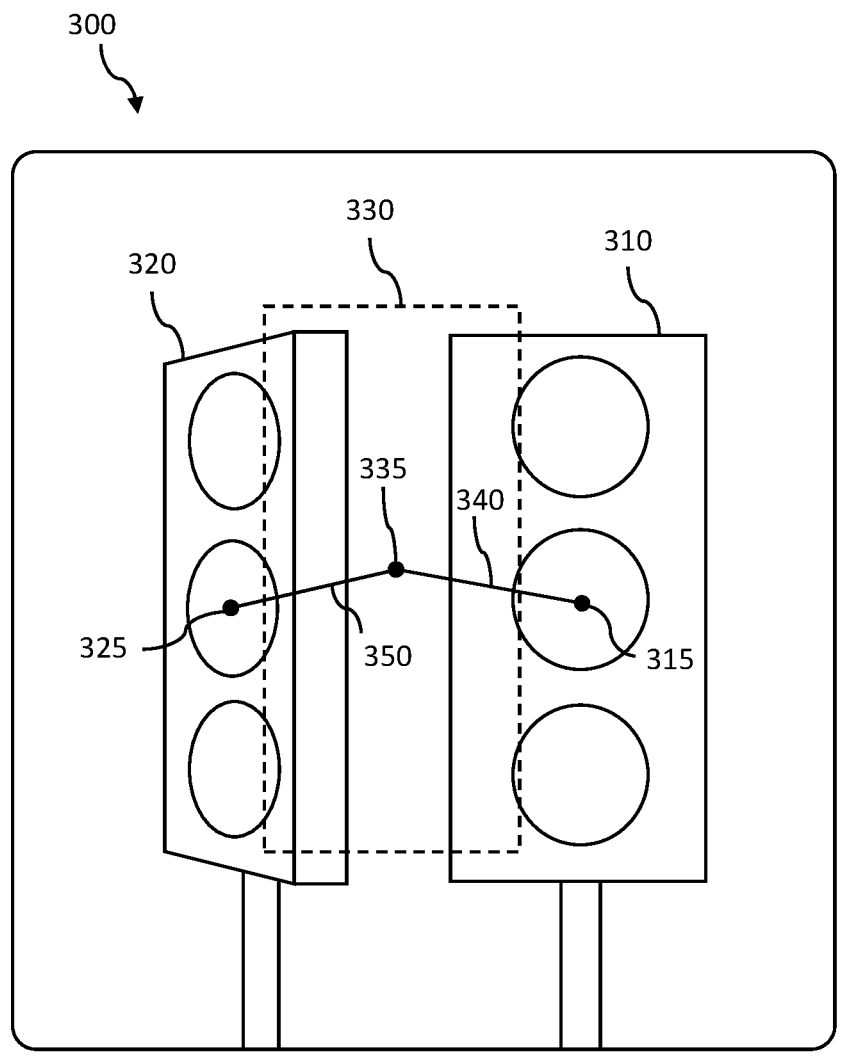
FIG. 3 shows real locations and an expected location of traffic light heads.

FIG. 3 illustrates an example image 300 of a first traffic light head 310 and a second traffic light 320 and an expected position of the first traffic light head 330 overlayed on the image 300 and obtained from map data. As can be seen, without taking into account the yaw of the traffic light heads 310, 320 it is difficult to disambiguate which of the traffic light heads 310, 320 is actually the first traffic light head.

One example technique for disambiguating the traffic light heads 310, 320 against map data involves determining the Euclidean distance between the centers of each of the traffic light heads 310, 320 and the center of the expected position of the first traffic light head 330. The Euclidean distance between the center of the first traffic light head 315 and the center of the expected position of the first traffic light head 335 is illustrated by a first line 340. The Euclidean distance between the center of the second traffic light head 325 and the center of the expected position of the first traffic light head 335 is illustrated by a second line 350. As can be seen from FIG. 3, the length of the first line 315 is shorter than the length of the second line 325, indicating that the second traffic light head 320 is closer to the expected position of the first traffic light head 330 than the first traffic light head 310. Considering only the Euclidean distance of each of the traffic light heads 310, 320, it may be incorrectly inferred that the second traffic light head 320 should be determined as the first traffic light head.

Yaw classification, or regression, data can be generated for each of the first and second traffic light heads 310, 320 using the processes described above, the yaw data being indicative of a level of yaw of the traffic light head with respect to a line of sight of the camera used to obtain the image 300. The yaw data can be used to weight the determined distances between the centers of the traffic light heads. For instance, the yaw data may indicate that the second traffic light head 320 is yawed at a greater angle than the first traffic light head 310. The distance between the center of the second traffic light head 320 and the center of the expected position of the first traffic light head 330 may be multiplied by a factor associated with the yaw data. In an example, the factor may be of the form (1−yaw_value), where yaw_value is a value between 0 and 1 indicative of an amount of yaw. As discussed above, the yaw_value may be a binary value. In one example, the yaw_value may be 0 or 1, depending on whether the traffic light head is determined to be yawed by an angle below a threshold angle or not. In other examples, the yaw_value may be indicative of a range of angles by which the traffic light head is yawed and may result from mapping a range of yaw angles to a value between 0 or 1, or may be allowed to take any value less than 1 (e.g. negative numbers are allowed so that the factor may be greater than 1).

In the example scenario 300 shown in FIG. 3, the second traffic light head 320 is determined to be yawed by an angle greater than the threshold angle and so is assigned a yaw_value of 0, whereas the first traffic light head 310 is determined to be yawed at an angle less than the threshold angle and so is assigned a yaw_value of 1. The distances between respective centers 315, 325, 335 of the traffic light heads 310, 320 and the expected position of the first traffic light head 330 may be multiplied by the factor (1−yaw_value) to determine two weighted distances. In this case, the weighted distances indicate that the first traffic light head 310 corresponds to the expected position of the first traffic light head 330 and so is the traffic light head determined to be permissible. Signals from the first traffic light 310 may be classified to determine which are active, and instructions may be generated to control a vehicle based on the classification, as discussed above.

In other scenarios, the distance between the centers of the traffic light heads may be used alongside the yaw estimations to determine whether a traffic light head is associated with an expected traffic light head from the map data. For example, each of the distance and yaw estimation may need to meet a threshold in order for the traffic light head to be considered valid. This may be used in situations where the actual valid traffic light head has been moved or is in an inactive state due to failure of power outage. Distant traffic light heads from the expected location of the valid traffic light head, but which are determined not to be yawed may be discounted based on the distance not meeting a threshold distance. If no traffic light heads are determined to meet the distance and yaw thresholds, this may indicate that a traffic light is not operating in the expected location, and classification of the expected traffic light head may be ceased.

Figure 4:
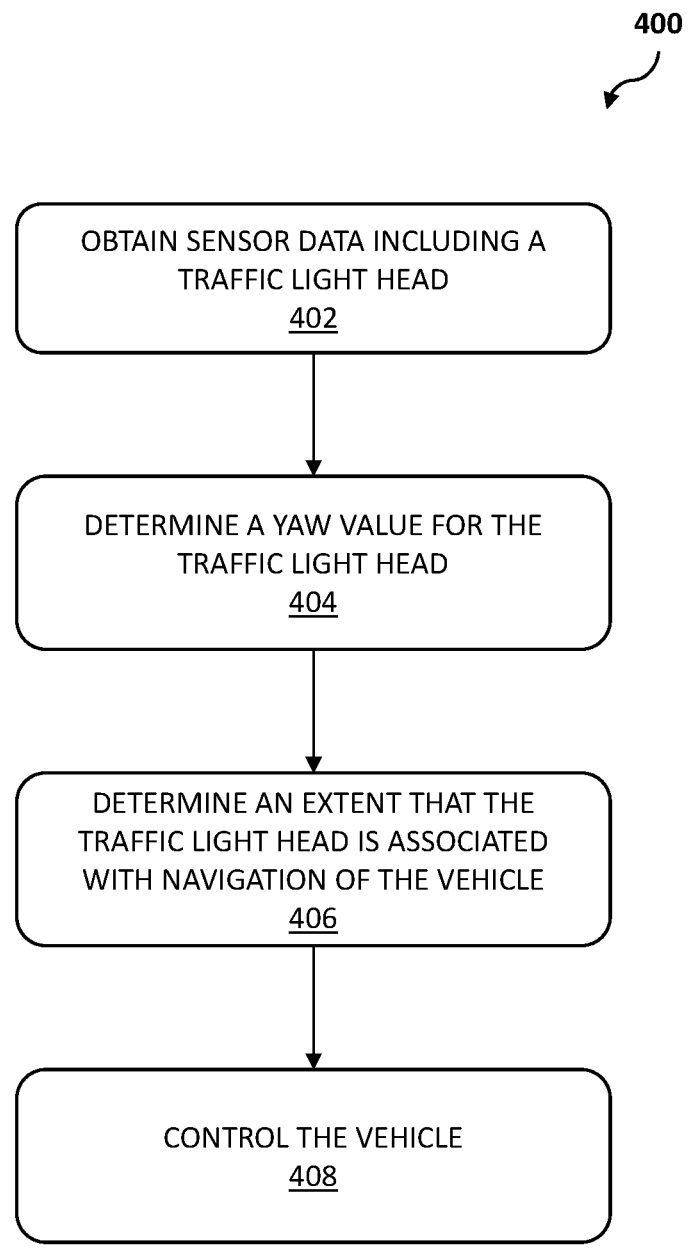
FIG. 4 depicts a flow chart of an example yaw disambiguation process.

FIG. 4 illustrates a flow chart of an example yaw disambiguation process 400. The yaw disambiguation process 400 may be performed by a processing device operating on an autonomous vehicle, such as the vehicle 102, or on a processing device in communication with such an autonomous vehicle. The processing device may be caused to execute the process 400 by computer-readable instructions stored on a non-transitory computer-readable medium.

As can be seen in FIG. 4, the process 400 includes, at block 402 obtaining sensor data including a traffic light head. The sensor data is obtained via a sensor associated with a vehicle.

At block 404, the process 400 includes determining, based at least in part on the sensor data, a yaw value for the traffic light head indicative of a degree that the traffic light head is yawed with respect to a line of sight of the sensor or the vehicle. The yaw value may be output by a machine learning algorithm such as a CNN. The yaw value may indicate whether a yaw angle of the traffic light head is approximately above a predetermined threshold angle. In another example, the yaw value indicates an approximate yaw angle of the traffic light head with respect to a line of sight of a camera.

At block 406, the process 400 includes determining an extent that the traffic light head is associated with navigation of the vehicle through a junction, based on the received data. The determination may involve noting that the yaw value indicates that the traffic light head is yawed at an angle greater than the predetermined threshold angle, for example. In this case, the traffic light head may be determined to be associated with navigation of the vehicle. Alternatively, if the yaw value indicates that the traffic light head is yawed by an angle less than the predetermined threshold angle, then it may be determined that the traffic light head is associated with navigation of the vehicle. This makes use of the observation that traffic light heads that correspond to a direction of travel generally appear at a lower yaw angle than those that do not correspond to a direction of travel.

At block 408, the process 400 involves controlling the vehicle based at least in part on the determination that the traffic light head is associated with the navigation of the vehicle. For example, a traffic light head determined to be approximately facing the vehicle may be considered relevant to navigation of the vehicle and therefore the vehicle should obey signals displayed by the traffic light head. The instructions may cause the vehicle to proceed through the junction when a signal on the traffic light head indicates a go signal, for example.

The process 400 may be performed for any number of traffic light heads in a field of view of a sensor of a vehicle. In this case, determining whether the traffic light head corresponds to a direction of travel may involve comparing the data for each of the traffic light heads. In one example, a traffic light head determined to be least yawed amongst a plurality of traffic light heads may be determined to correspond to the direction of travel. In another example, a plurality of traffic light heads with data satisfying one or more rules may be selected as traffic light heads corresponding to a direction of travel. For example, the rules may be as simple as selecting those traffic light heads determined to be yawed at less than predetermined angle, such as the predetermined threshold angle when a binary classification is used. This can be effective as there are typically at least two traffic light heads provided for each direction of travel to provide redundancy, although of course these may not all be in the field of view of a sensor simultaneously.

The process 400 may also involve determining whether each of the signals of the traffic light head, or traffic light heads when more than one is present, are active. The determination for each signal may involve determining an indication of whether the signal is active. The indication may be a binary classification (e.g. active or inactive). The indication may be a probability between 0 and 1. The indication may be an activity score between a range of values indicative of how likely it is that the signal is active. In the process 400, the indications may be weighted by the yaw data to determine a set of weighted indications. This may involve reducing or suppressing indications on traffic light heads determined to be yawed and/or increasing or enhancing indications on traffic lights that are considered not to be yawed.

The process 400 may involve obtaining map data indicating pose information of a traffic light head. An expected position of the traffic light head may then be determined based on the map data. When more than one traffic light heads are present in the vicinity of the vehicle, distances between the traffic light heads and the expected position of the traffic light head may be determined. The determined distances may be weighted by respective factors associated with the yaw data in order to generate adjusted distances. The weighted distances may then be used to determine which of the more than one traffic lights are relevant to the current direction.

Another example process may involve obtaining data generated from image data comprising a traffic light head captured by a sensor associated with a vehicle, the data indicative of a degree that the traffic light head is yawed with respect to a line of sight of the sensor or the vehicle; and determining, based on the data, an extent to which the traffic light head is associated with navigation of the vehicle through a junction associated with the traffic light head.

Table 1 below shows example results obtained using the process 400 compared to a process that does not take into account traffic light head yaw on the same set of test data gathered from a sensor mounted on a vehicle driven through a city in daytime. The test data is tagged with data of known actual signals active but this is not used in the test, so that the accuracy of an algorithm can be assessed. The results indicate how many were incorrectly classified (e.g. determined not to be active when actually active). Table 1 includes the total number of inconsistencies between the known data and the estimation procedures, as well as some of the particular types of inconsistency within the total. As can be seen from the results, the process 400 improves the accuracy of signal classification (reduces the number of inconsistencies) in all the categories listed during the day.

TABLE 1

Number of inconsistences in daytime test data with and without Yaw Consideration.

| Inconsistency Type | Yaw Consideration | Without Yaw Consideration |
|---|---|---|
| Total Inconsistencies | 331 | 850 |
| Red - Green Flicker Totals | 5 | 37 |
| Green - Red Flicker Totals | 0 | 26 |
| Total Flickers | 46 | 107 |

Table 2 below shows further example results obtained using the process 400 compared to a process that does not take into account traffic light head yaw on the same set of test data gathered from a sensor mounted on a vehicle driven through a city at night. As can be seen from the results, the process 400 improves the accuracy of signal classification (reduces the number of inconsistencies) at night also.

TABLE 2

Number of inconsistences in nighttime test data with and without Yaw Consideration.

| Inconsistency Type | Yaw Consideration | Without Yaw Consideration |
|---|---|---|
| Total Inconsistencies | 1064 | 1510 |
| Red - Green Flicker Totals | 12 | 45 |
| Green - Red Flicker Totals | 6 | 36 |
| Total Flickers | 83 | 102 |

Aggregating Traffic Light Heads Through Supportive Vote

Further examples of the present disclosure comprise a traffic light signal estimation process. That is, further examples contemplated herein relate to a process or procedure in which it is determined which traffic light signal amongst several possible signals is currently active. The estimation procedure may or may not involve taking into account a yaw estimation as discussed above.

Figure 5:
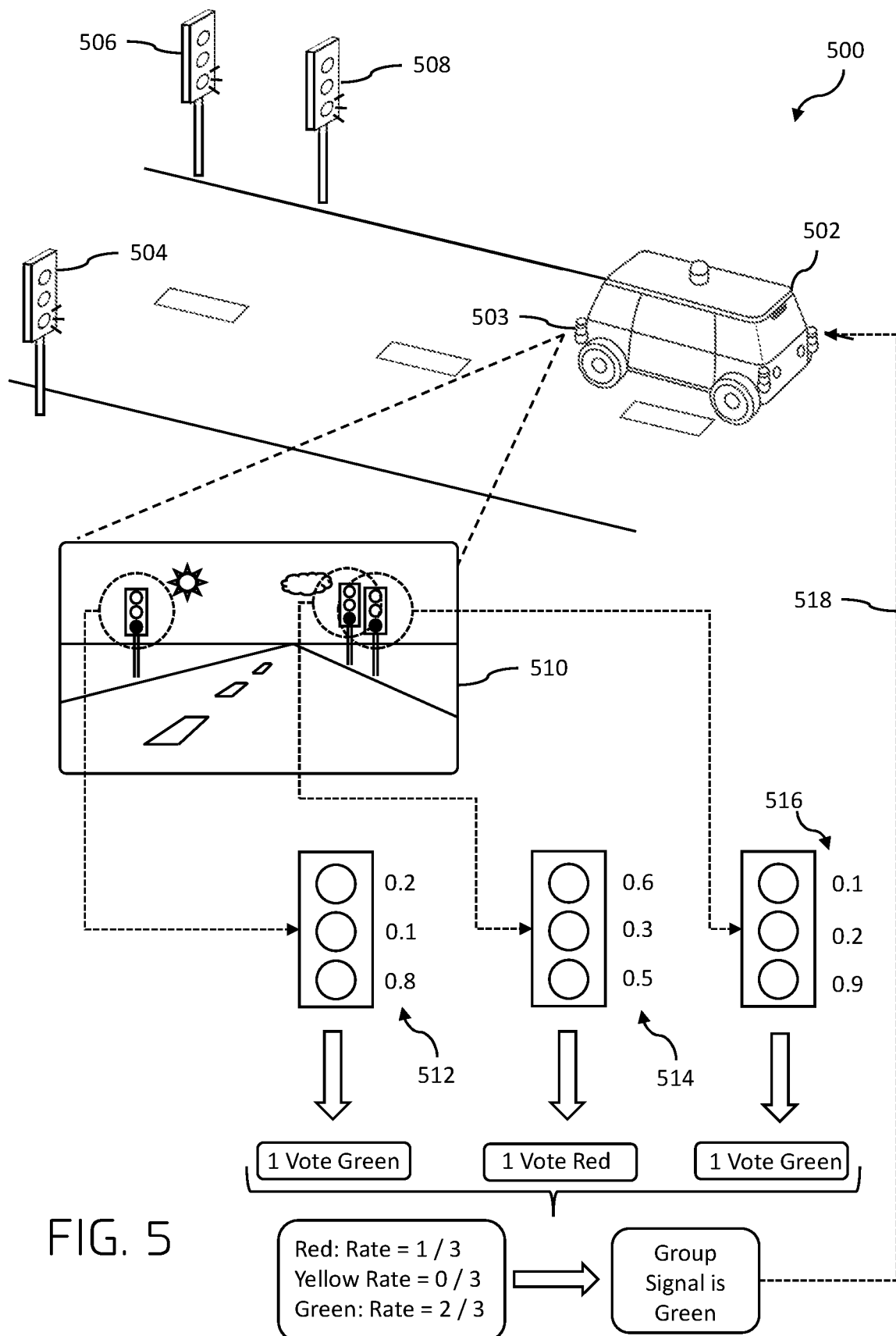
FIG. 5 is a further example scenario including a vehicle.

FIG. 5 illustrates another example scenario 500 including a vehicle 502 at a junction. The vehicle 502 may be an autonomous vehicle, and may be the same vehicle 102 depicted in FIG. 1. The vehicle 502 may include a vehicle computing device and may be part of a vehicle system that includes one or more remote computing devices.

The example scenario 500 involves the vehicle 502 using a sensor 503 to sense a plurality or group of traffic light heads 504, 506, 508 in the vehicle's immediate vicinity. Sensor 503 can be a vision or infrared sensor, for example. In this context, the group of traffic light heads comprise a number of traffic light heads that are relevant to, or associated with, a direction of travel of the vehicle 502 through a junction. For example, at a junction, the group of traffic light heads may be a subset of less than all of the traffic light heads at that junction. This subset of traffic light heads may be determined using distances between expected locations of traffic light heads and/or yaw estimations for the traffic light heads, for example.

Data obtained from the sensor 503 may be used, at least in part, to control the vehicle 502. For example, the data may be used to determine whether the vehicle 502 should stop at the junction or can proceed to travel through the junction.

The data is illustrated as an image 510 of a landscape comprising the traffic light heads 504, 506, 508. As discussed with regards to FIG. 2, the individual traffic light heads 504, 506, 508 may be detected within the image 510, using for example a CNN trained to classify images into a plurality of classes, with at least one of the classes corresponding to traffic light heads. The accuracy of the detection may be improved by obtaining map data indicating pose information of the traffic lights. The map data may assist in identifying the traffic light heads from the image 510. In particular, the map data may indicate one or more of a geographical location, local relative location, height, orientation of, and type of signals on, the traffic light heads, which may be used to identify the traffic light heads 504, 506, 508 from the image.

In an example, the map data may be used to ignore one or more traffic light heads that are in the image 510 because they are not located near an expected location of a traffic light head relevant to a direction of travel of the vehicle 502 through the junction.

As discussed above, properties of the traffic light heads 504, 506, 508 may be classified, detected, or identified using a further machine learning algorithm. In this case, the machine learning algorithm, such as a CNN, is trained to output indications of whether each signal of the traffic light heads 504, 506, 508 is active. Such a CNN may be trained using training images comprising traffic light heads known to have one or more signals active and tagged with data of which signals are active. The CNN may be trained to handle all types of signals displayable on a traffic light head in a region and so could be utilized to identify traffic light signals, even without the use of map data. Based on the output of the CNN and knowledge of which of the signals are active in the training image, the parameters of the CNN may be modified using any appropriate training algorithm.

In the scenario 500 illustrated in FIG. 5, the indications are arrays or sets of probabilities 512, 514, 516. In other examples, and as discussed above, the indications may comprise any other type of indicator such as a binary classification, numerical score or simply an indication of which signal is active.

A first set of probabilities 512 is associated with the signals of a first traffic light head 504. The signals, from top to bottom of the traffic light head, are red, yellow and green. The first set of probabilities comprise 0.2 for red, 0.1 for yellow and 0.8 for green. In the present example, a vote is allocated to the green signal for the first traffic light head, by taking the signal determined to have the highest probability. A second set of probabilities 514 is associated with a second traffic light head 506 and comprises 0.6 for red, 0.3 for yellow and 0.5 for green. Based on the second set of probabilities, a vote is allocated for red for the second traffic light head. A third set of probabilities 516 is associated with a third traffic light head 508 and comprises 0.1 for red, 0.2 for yellow and 0.9 for green. Based on the third set of probabilities 516, one vote is allocated for green for the third traffic light head.

The votes are then accumulated, tallied, incremented or counted to give 2 votes for green and 1 vote for red.

Although the number of votes could be used directly, in the present scenario 500, rates for each of the signals are calculated. The rates are calculated by summing the number of votes for a signal and dividing by a number of traffic light heads on which the signal is displayable. The rates in this case are 1/3 for red, 0/3 for yellow and 2/3 for green. The signal having the highest rate may then be determined as the signal determined to be active. In this case, the green signal is selected. This selection is used to generate instructions to control the vehicle, illustrated by the dashed arrow 518. In this case, it can be seen that the vote for red was overridden by the green votes, which can help to avoid blocking scenarios of false positive red signals while maintaining safe operation.

There are other possibilities based on such a voting scheme. Rather than simply taking the highest probability to determine the vote, prior to allocating the votes, the indications may be weighted. The weighting may be performed based on whether the traffic light is yawed with respect to a line of sight of the sensor, as discussed above in the section "Yawed Traffic Lights". Alternatively, or additionally, the weighting may be performed to prioritize one or more signals. For instance, a red signal may be prioritized to improve safety and adopt a more cautious approach. The indications may be weighted to reduce (or suppress) an indication for a green signal and/or increase (or enhance) an indication for the red signal. In some cases, when the indications are probabilities, the probability for the green signal can be weighted as follows:

$$P'(\text{green}) = P(\text{green}) \times (1 - P(\text{red}))  \quad \text{Equation 1}$$

where P' (green) is the modified probability that the green signal is active, P (green) is the unmodified probability that the green signal is active and P (red) is the probability that the red signal is active.

The weighting of Equation 1 makes use of the fact that red and green traffic signals are not normally displayed simultaneously. In this way, whenever P (red) is above 0.5, P' (green) is always less than P (red) and so the red signal is prioritized over the green signal. Similarly, P (red) acts to reduce P' (green) whenever P (red) is non-zero. While in the example scenario 500 depicted in FIG. 5, applying the weighting of Equation 1 to the green signal indication would not affect the result of the voting scheme, it may have an effect in other scenarios. For example if, in the first set of probabilities, the probability for red is 0.5 instead of 0.2, while the probabilities of yellow and green are unchanged at 0.1 and 0.8 respectively. P' (green) would be 0.4 and the first traffic light head would instead vote for red. The number of votes for red would change to 2 and the number of votes for green would change to 1. Thus, the red signal would be determined to be active. Such an approach may provide improved safety in certain environmental conditions where the active traffic signal is more ambiguous (such as direct sunlight on a traffic light head).

The weighting may also be based on a relative distance of the traffic light heads from the sensor 503. A closer traffic light head may indicate that the traffic light head is associated with navigation of the vehicle through the junction and so may be given a higher priority to a traffic light head that is further away. Range finding techniques could be used to determine the relative distances of traffic light heads to the sensor 503. Image processing techniques may alternatively, or additionally, be used to determine the relative distances. For example, the relative sizes of traffic light heads in image data may be used.

Figure 6:
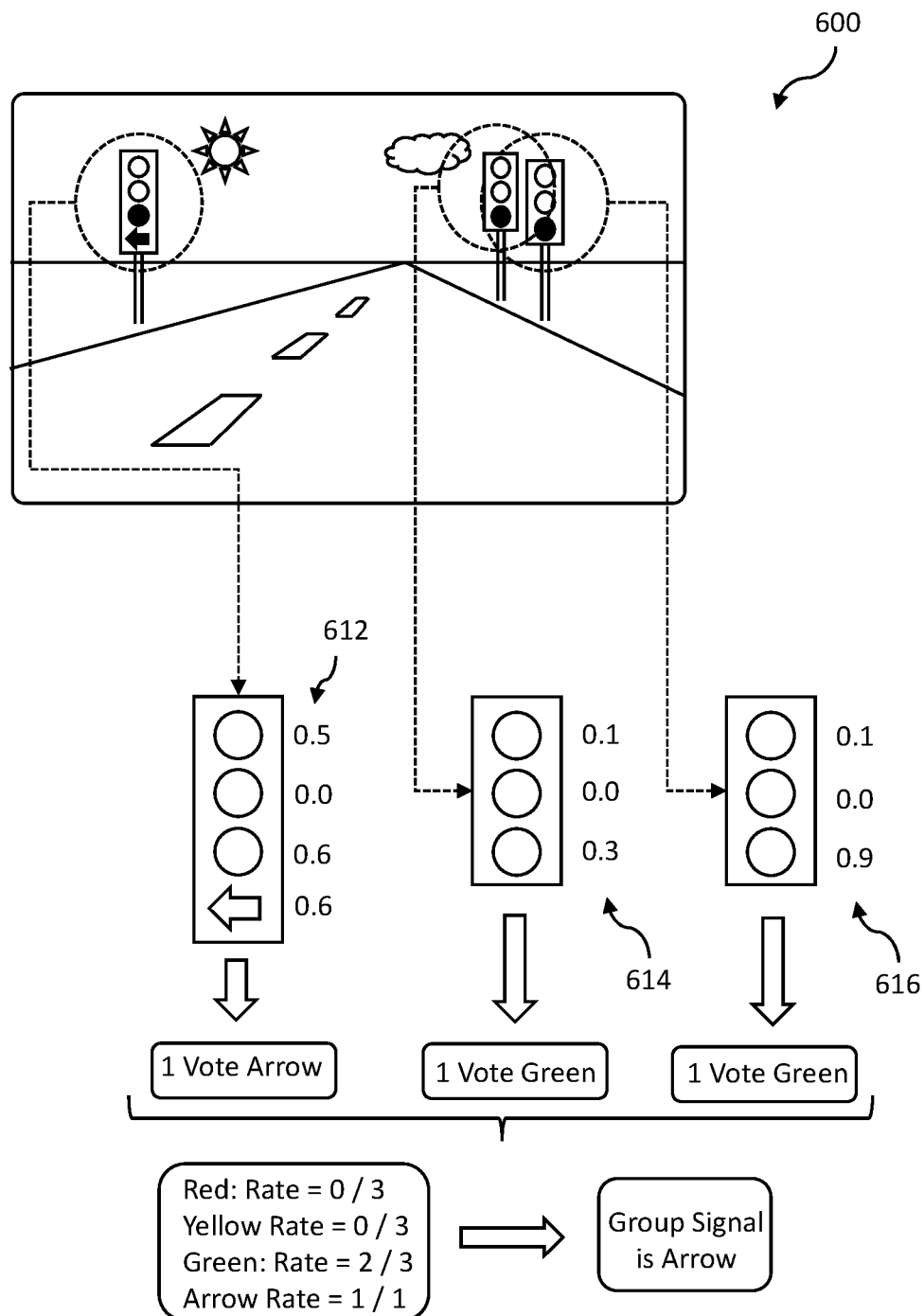
FIG. 6 is a further example scenario including a vehicle.

FIG. 6 illustrates a further example scenario 600 wherein a first of a plurality of traffic light heads comprises an arrow signal. A simple estimation scheme may select the arrow as active only when the indication of the arrow is higher than every other signal indication, and so the arrow may be determined to be active less often than it actually is. The procedure used in the example scenario 500 is modified in the example scenario 600 to also consider the arrow signal and to provide an improved estimation scheme when compared with such a simple estimation scheme. As discussed above, indications may be obtained corresponding to a likelihood that each of the signals on the plurality of traffic light heads are active, including an indication for the arrow signal.

As before, a first set of probabilities 612 is associated with the signals of the first traffic light head. The first set of probabilities comprise 0.5 for red. 0.0 for yellow, 0.6 for green and 0.6 for the arrow. In this case, the indications for the green and arrow signals are the same. One or both of the indications may be weighted as discussed above to prioritize one signal over another. For example, applying prioritization to the red signal by weighting the indication for the green signal would cause the arrow signal to have the highest indication and receive the vote for the first traffic light head.

In another example, both the green and arrow signals may each receive a vote from the first traffic light head. In yet another example, one or more rules may exist to determine how to handle the case wherein two signals share the highest indication. For example, red may always be given the vote when it shares the highest indication with another signal.

In the scenario of FIG. 6, a vote is allocated to the arrow signal because the indication for green signal is reduced by the algorithm of equation 1 above, leaving the arrow probability as the highest. A second set of probabilities 614 is associated with a second traffic light head. The second set of probabilities 614 comprise 0.1 for red, 0.0 for yellow and 0.3 for green. Based on the second set of probabilities, one vote is allocated for green. A third set of probabilities 616 is associated with a third traffic light head. The third set of probabilities are 0.1 for red, 0.0 for yellow and 0.9 for green. Based on the third set of probabilities 616, one vote is allocated for green.

Accumulating the votes, there is 1 vote for the arrow, and 2 votes for green. Once again, calculating the rates for the respective signals, one gets a rate of 0/3 for red, 0/3 for yellow, 2/3 for green and 1/1 for the arrow. Selecting the highest rate results in the arrow signal being determined to be the active signal. From this example, it can be seen how the voting scheme according to the present disclosure can improve the accuracy of traffic light group permissibility estimation.

Other signals may be taken into consideration, such as different states of traffic light signals may be considered. One example involves flashing traffic lights. In the example scenario 500, probabilities may be assigned to red, yellow and green signals as shown in FIG. 5, as well as assigned to yellow flashing and/or red flashing. Examples of determining a likelihood that a traffic light signal is flashing are discussed below. Votes may then be allocated to flashing signals if they are determined to be active on a traffic light head, and therefore this may result in a determination that a flashing signal is indicated by the group of traffic light heads.

In a further example, more than one traffic light signal may be determined to be active as a result of the voting. This may involve, for example, selecting those signals with rates calculated from the voting that are above a predetermined threshold rate. In one example, signals having a rate higher than 1/2 may be determined as active. If this is performed in the scenario 600 depicted in FIG. 6, then both the arrow and green signals are determined to be active.

Figure 7:
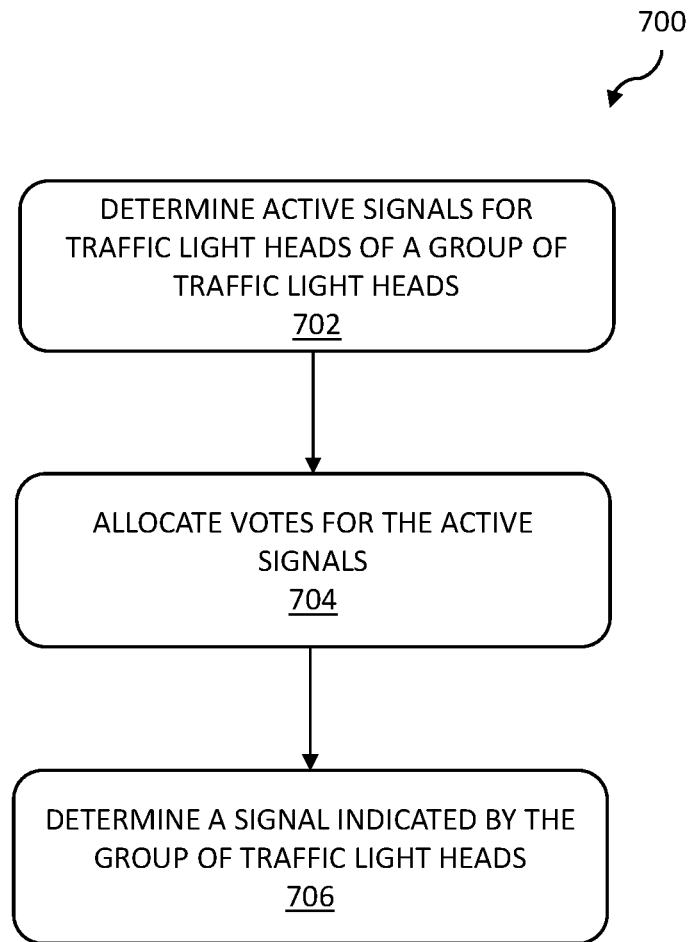
FIG. 7 depicts a flow chart of an example traffic light signal estimation process.

FIG. 7 illustrates a flow chart of an example traffic light signal estimation process 700. The traffic light signal estimation process 700 may be performed by a processing device operating on an autonomous vehicle, such as the vehicle 502, or on a processing device in communication with such an autonomous vehicle. The processing device may be caused to execute the process 700 by computer-readable instructions stored on a non-transitory computer-readable medium.

As can be seen in FIG. 7, the process 700 includes, at block 702 determining active signals for traffic light heads of a group of traffic light heads, wherein members of the group of traffic light heads share an active signal at a point in time. Determining that the signals are active may involve obtaining indications that signals are active on each of the traffic light heads. The indications may comprise any type of indicator such as a probability, binary classification and a numerical score. The indications may be generated by inputting image data into a machine learning algorithm, such as a CNN. The machine learning algorithm may be trained to classify image data into a plurality of classes corresponding to the possible indications. The image data may be pre-processed to identify the group of traffic light heads, perhaps using a further machine learning algorithm.

The identification of the group of traffic light heads may be improved by obtaining map data indicating known locations of the group of traffic light heads and using the known locations to identify the group of traffic light heads in the image data. In some cases, the group of traffic light heads relevant to a current direction of travel of the vehicle through a junction may be determined from all of the traffic light heads at a junction. In some examples, the map data may be at least partially used to make such a determination.

The received indications may be weighted by factors associated with the signal and/or the traffic light on which the signal is. This may be in order to prioritize one or more of the signals, such as a stop signal, and/or to adjust the indications based on a yaw estimation of the traffic light head comprising the signals.

Determining at least one active signal on each traffic light head of the group of traffic light heads may involve selecting a signal having the highest indication on each traffic light head. It may alternatively involve selecting one or more signals having an indication above a predetermined threshold indication. It may also involve determining a plurality of signals having the same, highest, indication.

At block 704, the process 700 involves allocating votes for the signals determined to be active. That is, the one or more signals determined to be active on each traffic light head may be allocated a vote. Each vote may be weighted based on the signal that received the vote and/or the traffic light head that comprises the signal. The weighting may be predetermined to prioritize one or more signals, such as a stop signal, or to weight the vote based on a yaw estimation of the traffic light head comprising the signal.

At block 706, the process 700 involves determining a signal indicated by the group of traffic light heads based on the allocated votes. This may involve collating all of the votes and determining which of the signals received the highest number of votes.

In further examples, the process 700 involves, after block 704, calculating rates for each signal displayable by the group of traffic light heads based on a number of votes for the signal divided by the total number of traffic light heads in the plurality of traffic lights on which the signal is displayable. The rates may then be used to determine which signal(s) is/are active on the group of traffic light heads. The determination may be the signal having the highest rate or may be based on which of the signals have a rate above a predetermined threshold rate.

Table 3 shows example results obtained using the process 700 compared to a control process that does not use a voting scheme. The control process involves selecting the highest probabilities across the sets of traffic light heads for each signal and prioritizing stop signals with the weighting of equation 1 in order to determine which signal is active. Both the process 700 and the control process where applied to the same set of test data, which is associated with ground truth data of active signals to enable performance to be assessed. Table 3 shows the number of "flicker" inconsistencies identified, where the determination of an active traffic rapidly changes or "flickers" between two states. The processes were performed on data representing scenarios where one active traffic light signal transitions to another active traffic light signal. As can be seen from the results, the voting scheme process 700 had fewer inconsistencies between the predictions and ground truth data than the control scheme in almost all scenarios. The process 700 therefore represents an improvement in generating accurate predictions of which traffic light signals amongst a plurality of traffic light signals are active compared to the control scheme.

TABLE 3

Number of inconsistences in test data between a control scheme and a voting scheme

| Flicker Type | Control Scheme | Voting Scheme |
| --- | --- | --- |
| Green to Red | 23 | 3 |
| Green to Yellow | 9 | 8 |
| Green Left Arrow to Green | 136 | 105 |
| Green Left Arrow to Red | 2 | 4 |
| Green Left Arrow to Yellow | 1 | 0 |
| Red to Green | 33 | 12 |
| Red to Green Left Arrow | 2 | 3 |
| Red to Yellow | 10 | 9 |
| Yellow to Red | 12 | 9 |
| Green to Green Left Arrow | 144 | 113 |
| Yellow to Green | 0 | 1 |

Flashing Traffic Lights

Figure 8:
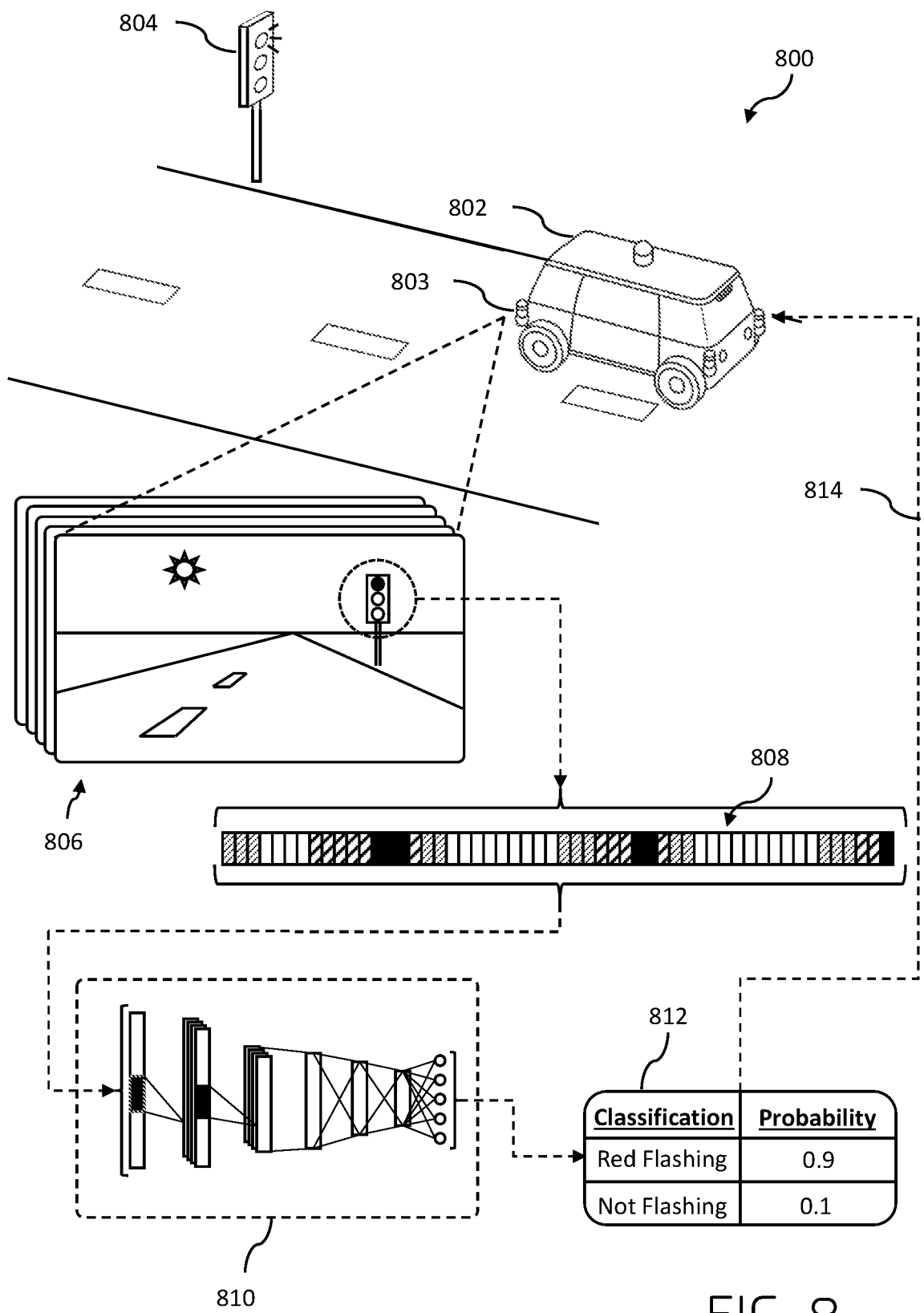
FIG. 8 is a further example scenario including a vehicle.

Further examples of the present disclosure relate to detecting a flashing traffic light signal. FIG. 8 illustrates another example scenario 800 including a vehicle 802 at a junction. The vehicle 802 may be an autonomous vehicle. The vehicle 802 may include a vehicle computing device and may be part of a vehicle system that includes one or more remote computing devices.

The example scenario 800 involves the vehicle 802 using a sensor 803 to sense a traffic light head 804 in the vehicle's immediate vicinity. As previously discussed, the sensor 803 generates image data that includes the traffic light head 804.

In the example scenario 800, the image data is illustrated by a plurality of images 806 comprising the traffic light head 804.

Each of the images 806 is associated with data indicative of a time at which it was captured. Examples include a timestamp based on a real-time clock or based on some other time reference, such as a numbering system that increments or decrements predictably with the passage of time. In some examples, one or more further sensors also generate images with associated data indicative of the time in which they were captured. The images generated by the sensor 803 and the one or more other sensors may be then stored as soon as they are generated, for example by being posted to a stack. The sequence of stored images may then be out of time order in the stack. The indications of the respective times that the images were generated can therefore be used to time-order the images.

As described above, the images may be processed to first detect the traffic light head 804, and then further processed to determine a classification/estimation of the likelihood that a signal on the traffic light head 804 is currently active. This may be performed for a plurality of images captured by the sensor(s) so that a sequence of classifications 808 may be generated, the sequence indicating whether the traffic light signal was active at the respective times in time order. In the time-ordered sequence of classifications 808, darker classifications indicate a higher likelihood that the traffic light signal is active. For clarity, only the red signal is depicted in FIG. 8, although other examples may consider all signals on a traffic light head 804.

It will be appreciated that the time-ordered sequence of classifications can be generated in time order with subsequent classifications appended as necessary, or out-of-order with the associated data indicative of time used to order the sequence as appropriate.

The sequence 808 has a predetermined fixed length corresponding to a sliding time-window of measurements. For example, the sequence 808 may have a fixed number of classifications with each contiguous classification approximately evenly spaced in time. The temporal spacing between contiguous classifications may fall within a predetermined time period. The time period may be between 50 and 150 ms, between 80 and 120 ms or around 100 ms, for example.

The sequence 808 is input into a CNN 810. The CNN 810 is trained to classify sequences into at least two classes corresponding to whether the sequences indicate that a signal is flashing or not. The CNN 810 may be trained according to any appropriate training process. One such process involves inputting training time-ordered sequences of classifications into the CNN 810, the training sequences known to relate to traffic light signals that are either flashing or not. The output of the CNN 810 may be used in conjunction with the known input to adjust the parameters of the model using any known optimization scheme.

In the example scenario 800, the output of the CNN 810 is illustrated in the table 812. The table 812 provides an indication of the likelihood that the traffic light signal is flashing. In this case, the output of the CNN indicates that there is a 90% chance that the traffic light signal is flashing based on the sequence 808. This may be at least partially used to generate instructions to control the vehicle 802, illustrated by the dashed arrow 814. Note that in other examples, the output of the CNN 810 may be a binary classification corresponding to whether the signal is flashing or not. In this particular case, it is determined that a red signal, corresponding to a stop signal, is flashing. This may indicate that the traffic light should be treated as a stop sign and right-of-way rules should be applied, for example. The vehicle may therefore be instructed to stop but also put in a state that is ready to proceed through the junction when it is determined that it is safe to do so.

Figure 9:
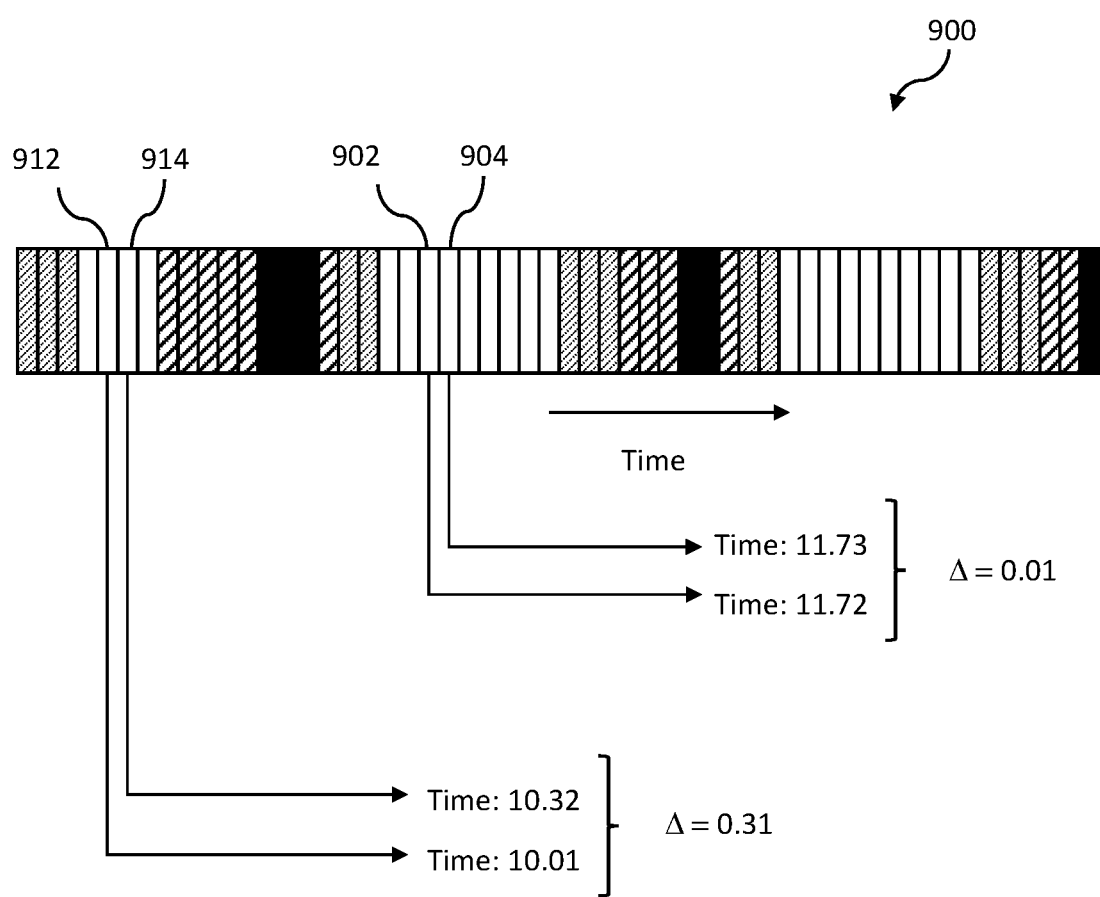
FIG. 9 illustrates an example sampling method for data to be input to a convolutional neural network.

Example methods to generate a sequence having a predetermined fixed length corresponding to a sliding time-window of measurements will now be discussed. In particular, classifications may be added and/or removed from the sequence according to one or more rules. FIG. 9 illustrates an example time-ordered sequence of classifications 900. When processed, such as by a CNN 810 discussed above, each indication or measurement is considered to relate to the same time length of time, as illustrated by the constant width. In some cases, this may not be correct and FIG. 9 is a representation of how the sequence may be adjusted before processing.

As depicted in FIG. 9, it is determined that a time period between a first classification 902 and a second classification 904, which is contiguous to the first classification, is below a predetermined threshold. That is, that the contiguous classifications 902, 904 are too close to one another. In this case, the first classification 902 is associated with a time of capture of 11.72 seconds and the second classification 904 is associated with a time of capture of 11.73 seconds. The difference between the capture times is 10 ms which falls below a threshold of 100 ms. Based on this determination, the second classification 904 may be removed from the sequence 900. This may be performed along the length of the sequence 900 so that all contiguous classifications are separated by time periods above and/or equal to the predetermined threshold. Having contiguous classifications that are separated by too small a time-period may not improve the accuracy of the classification procedure. Removing data in this way reduces complexity and improves computational efficiency. For example, if the algorithm considered a time period of 2 seconds. 100 ms between values required 21 values to cover the period, less than the 41 values if there is 50 ms between values.

It is further determined that a time period between a third classification 912 and a fourth classification 914, which is contiguous to the third classification 912, is above a predetermined threshold. That is, that neighboring classifications 912, 914 are too far apart from each other. For example, the third classification 912 may be associated with a time of capture of 10.01 seconds and the fourth classification 914 may be associated with a time of capture of 10.32 seconds. The difference between the capture times is 310 ms which is above a threshold of 100 ms. There may be several reasons for gaps in the classification sequence. One possible reason may be that no signal on the traffic light head was active within the time period and so no traffic light was detected (for example, when all signals are off in a dark environment, it can be difficult to even identify the traffic light head in the sensor data).

Based on this determination, one or more further classifications may be inserted or added into the time-ordered sequence of classifications 900 between the third classification 912 and the fourth classification 914. While this may take any value, inserting a classification indicating that the traffic light signal is inactive gives good accuracy. This may be because the lack of data is indicative of an inactive signal at that time. Prioritizing a state of a signal as if it were inactive may improve safety.

Performing these processes discussed with regards to FIG. 9 along the length of a sequence can ensure that contiguous classifications are separated by roughly constant time steps so that the sequence corresponds to approximately a fixed time-window and has the expected size for the CNN.

In the present disclosure, a CNN is applied to resolve features in temporal data corresponding to traffic light signal classifications as discussed above. The CNN may be trained to classify input data comprising a plurality of channels corresponding to time-ordered sequences of classifications of respective signals into a plurality of classes. In an example, the signals may be red, yellow and green so that the input data comprises three channels corresponding to each of the three colors. The plurality of classes may include classes for red flashing signals, yellow flashing signals and no flashing signals.

The processing of the CNN therefore acts on the temporal data in parallel. Parallel processing of multi-channel input data using a CNN may improve classification of the input data due to the nature of the convolution process which processes and combines multi-channel input into a single channel output. The CNN can therefore be trained to classify multi-channel input data into a plurality of classes such as the red flashing, yellow flashing, and no flashing classes. The time-ordered sequences of classifications may be generated (and possibly time-ordered) and aggregated into multi-channel input data to be input into the CNN.

While the processing of temporal data may be used to determine whether a traffic light signal is flashing, corresponding frequency data may be used in addition, or alternatively. For example, the time-ordered sequence of classifications may be transformed to the frequency domain by performing a discrete Fourier Transform or a Fast Fourier Transform on the sequence. The resulting frequency data may be processed to determine whether it is indicative of a flashing traffic light signal. A CNN may be used to classify the frequency data, with the CNN being trained on training frequency data. In another example, the frequency data may be processed independently of a CNN. The rate of flashing of traffic light signals in a particular region can be predicted, and so the frequency data may be inspected for peaks around the predicted frequencies. Peaks in the amplitude and/or in the power spectrum above a predetermined threshold may be indicative of a flashing signal.

Figure 10:
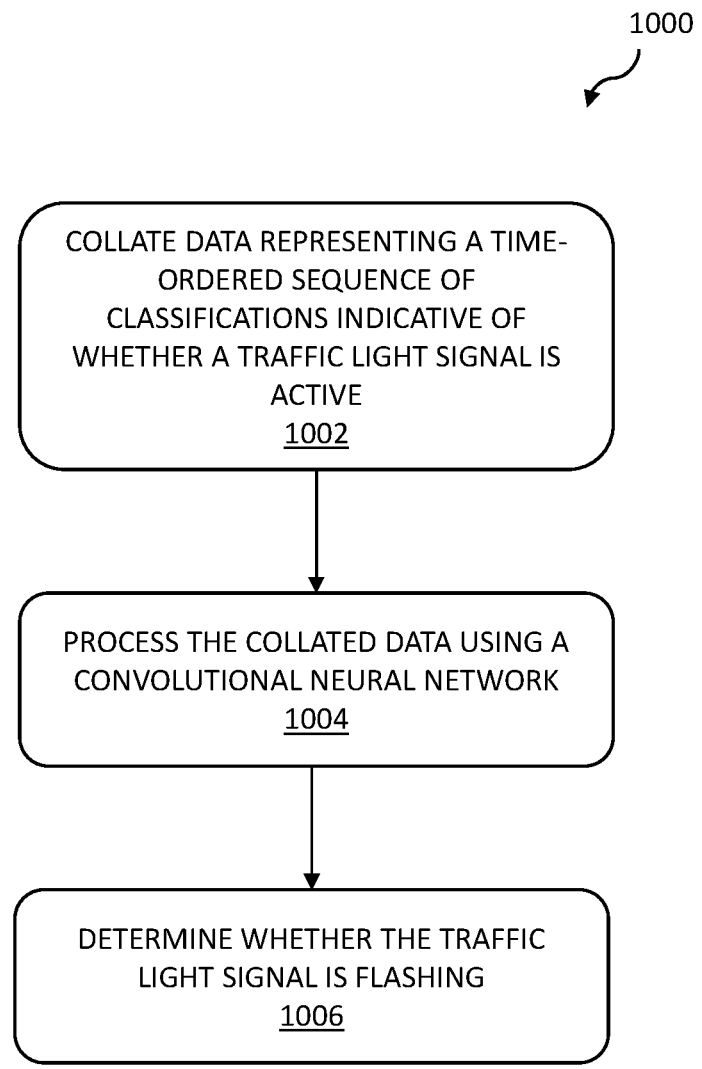
FIG. 10 depicts a flow chart of an example flashing traffic light signal estimation process.

FIG. 10 illustrates a flow chart of an example flashing traffic light signal detection process 1000. Process 1000 may be performed by a processing device operating on an autonomous vehicle, such as the vehicle 802, or on a processing device in communication with such an autonomous vehicle. The processing device may be caused to execute the process 1000 by computer-readable instructions stored on a non-transitory computer-readable medium.

As can be seen in FIG. 10, the process 1000 includes, at block 1002 collating data representing a time-ordered sequence of classifications, or estimations, indicative of whether a traffic light signal is active at respective times. As previously discussed, the classifications may be a binary classification (e.g. active or inactive), a probability between 0 and 1, or an activity score between a range of values indicative of how likely it is that the signal is active, amongst other examples. The data may be received by the processing device and may have been previously generated, using any of the procedures discussed herein. Alternatively, the data may be generated by processing measurements captured by one or more sensors associated with the vehicle. The processing may involve inputting the measurements into one or more machine learning algorithms in order to generate the classifications. The classifications may already be in time order or may be accumulated or collated into a time-ordered sequence of classifications.

At block 1004, the process 1000 involves processing the collated data using a CNN. The CNN may be trained to classify training time-ordered sequences of classifications into a plurality of classes. At least one of the classes corresponds to sequences indicating that a traffic light signal is flashing and at least one other class corresponds to sequences indicating that a traffic light signal is not flashing. The collated data may therefore be input into the CNN in order to generate an indication of whether the time-ordered sequence of classifications is indicative of a flashing traffic light. In another example, the collated data is first transformed into the frequency domain before being input into a CNN trained to classify training frequency data into a plurality of classes. At least one of the classes corresponds to frequency data indicating that a traffic light signal is flashing and at least one other class corresponds to frequency data indicating that a traffic light signal is not flashing.

The process 1000 may further involve collating further data representing a time-ordered sequence of classifications indicative of whether a second traffic light signal is active at respective times. In an example, the first traffic light signal is a red signal and the second traffic light signal is a yellow signal. The data corresponding to the red and yellow signals may be aggregated into a single set of data comprising two channels corresponding to the two sequences of classifications. The aggregated data may then be input into the CNN as individual channels whereby to classify both sequences at the same time. This may provide an improved determination of which of the traffic light signals are flashing because the CNN can be trained to take into account data corresponding to multiple signals. For example, when the two sequences indicate that the red signal is flashing and the yellow signal is not flashing, the CNN may be able to further disambiguate the different classifications, increasing the indication that the red signal is flashing and decreasing the indication that the yellow signal is not flashing. Other examples may include data of traffic light signals which do not flash because data of those may improve the accuracy of whether other signals are flashing. (For example, a red light does not normally flash while a green signal is active.) A similar aggregation of multiple arrays of frequency data corresponding to different traffic light signals may be performed prior to inputting the frequency data into the CNN.

At block 1006, the process 1000 involves determining whether the traffic light signal is flashing based on the output of the CNN. Based on this determination, the process 1000 may further involve generating instructions to control a vehicle based on the determination of whether the traffic light signal is flashing.

In some examples, the traffic light signal determined to be flashing is a stop signal. A further classification may be received indicating that a go signal is active. This further classification may be received from a model trained to output indications of whether a traffic light signal is statically active, as opposed to flashing. In this case, the determination of that the stop light is flashing may be prioritized over the determination that the go signal is active, and may feed into the generation of instructions to control the vehicle.

Combinations

It is understood that any of the examples discussed in the above sections titled "Yawed Traffic Lights", "Aggregating Traffic Light Heads Through Supportive Vote" and "Flashing Traffic Lights" may be practiced in isolation, or combined as needed. They all may allow improved accuracy of traffic light signal recognition and this improvement is not exclusive of the other examples.

For example, the determination of whether a traffic light head appears yawed may be used to influence further processing downstream, such as in the voting procedure to determine which of a plurality of traffic light signals are currently active. This may involve weighting votes for signals on yawed traffic lights such that they are less likely to be determined to be active. Alternatively, or in addition, this may involve weighting votes for signals on not-yawed traffic lights such that they are more likely to be determined to be active.

The determination of whether a traffic light head appears yawed may be used to determine whether a traffic light signal on the traffic light head is flashing. For example, a yaw estimation indicating that a traffic light head is yawed may be included as part of the input data to the CNN. The CNN may therefore be trained to receive time-ordered sequences of classifications and yaw estimations to determine whether a traffic light signal is flashing. In particular, less light may be received by a sensor from the yawed traffic light head signal compared to a signal from a non-yawed traffic light head and so it may be more difficult for the CNN to correctly classify the traffic light signal as flashing or not.

If the yaw estimation indicates that the traffic light head is yawed, then signals detected on the traffic light head may be ignored in the further processing downstream. For example, these signals could be omitted from the voting scheme and/or flashing traffic light classification, which may improve their respective predictions by removing irrelevant signals from the processing.

A determination that a traffic light signal is flashing may be used in conjunction with the voting scheme to determine which of a plurality of signals are currently active. In an example, a flashing signal may be designated priority over other, non-flashing signals. This may be achieved by applying one or more rules which involve selecting a flashing signal as the signal determined to be active. This may also be achieved by weighting the votes and/or active signal indication of the flashing signal, for example. A flashing signal may be used in the voting scheme.

It is further understood that for a group of traffic light heads, the determination of whether a traffic light signal in the group is yawed as well as the determination of whether a traffic light signal in the group is flashing may influence the voting mechanism used to predict an active signal in the group.

Additional Example Vehicle System

Figure 11:
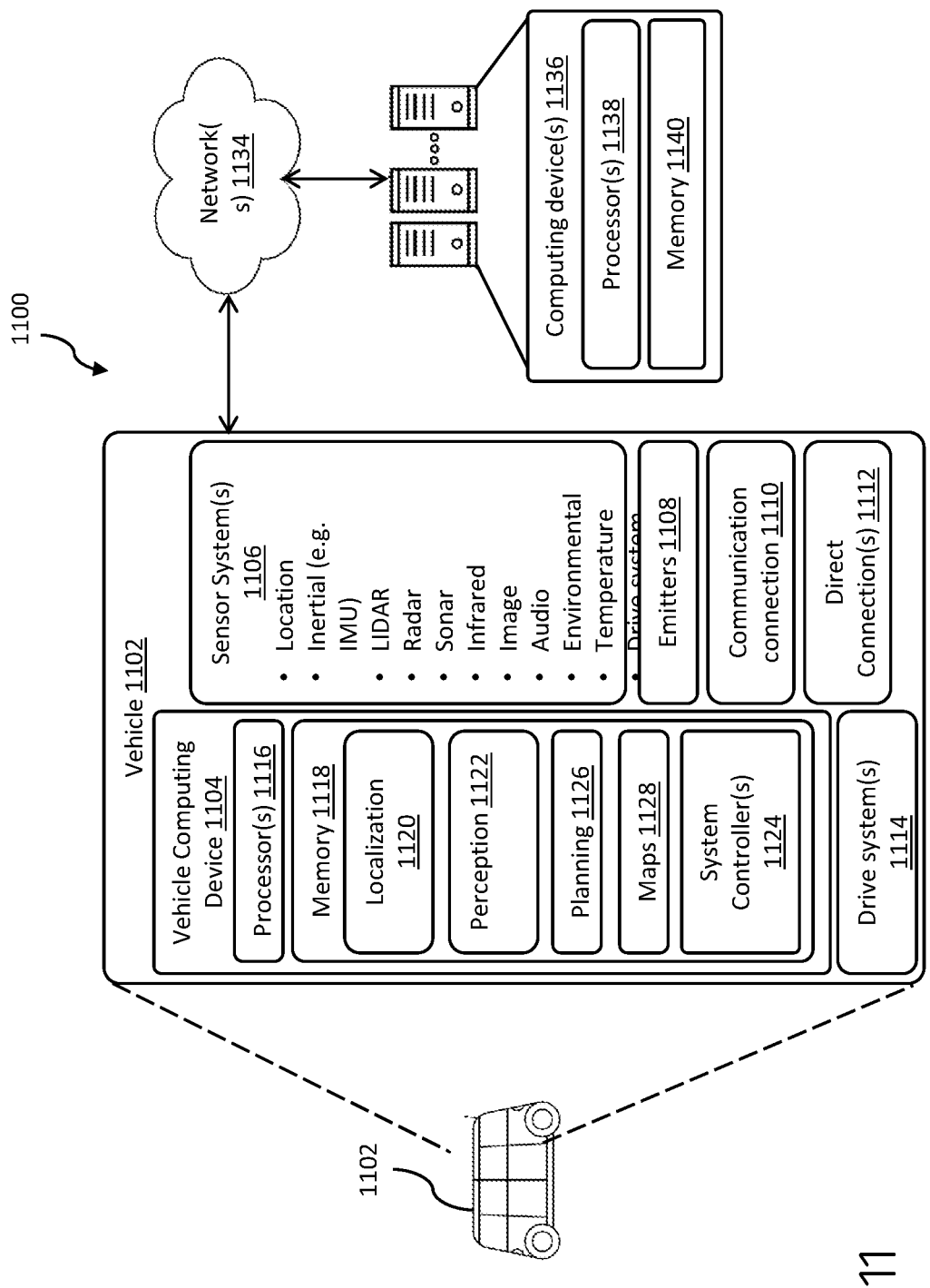
FIG. 11 depicts a block diagram of an example vehicle system.

A further example of a vehicle system 1100 is depicted in FIG. 11. The vehicle system 1100 includes a vehicle 1102, and may be any of the vehicles 102, 502, 802 of FIGS. 1. 5 and 8 respectively. In some instances, the vehicle 1102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 1102 may be a fully or partially autonomous vehicle having any other level or classification. Moreover, in some instances, the techniques described herein may be usable in conjunction with non-autonomous vehicles as well.

The vehicle 1102 may include vehicle computing device(s) 1104, one or more sensor systems 1106, one or more communication connections 1110, at least one direct connection 1112 (e.g., for physically coupling the vehicle 1102 to exchange data and/or to provide power), and one or more drive systems 1114.

In some instances, the sensor(s) 1106 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 1106 may include multiple instances of each of these or other types of sensors. For instance, the LIDAR sensors may include individual LIDAR sensors located at the corners, front, back, sides, and/or top of the vehicle 1102. As another example, the cameras may include multiple cameras disposed at various locations about the exterior and/or interior of the vehicle 1102. The sensor(s) 1106 may provide input to the vehicle computing device(s) 1104 and may in particular provide measurements of one or more traffic light heads.

The vehicle computing device(s) 1104 may include one or more processors 1116 and memory 1118 communicatively coupled with the one or more processors 1116. In the illustrated example, the memory 1118 of the vehicle computing device(s) 1104 stores a localization component 1120, a perception component 1122, a planning component 1126, one or more maps 1128, one or more system controllers 1124, and a safety system 1130. Though depicted in FIG. 11 as residing in memory 1120 for illustrative purposes, it is contemplated that the localization component 1120, perception component 1122, planning component 1126, safety system 1130 and/or the one or more maps 1128 may be accessible to the vehicle 1102 (e.g., stored on, or otherwise accessible by, memory remote from the vehicle 1102).

An example of this remote memory is the computing device 1136. The computing device 1136 may include one or more processors 1138 and memory 1140. Although not depicted here, in some instances the computing device 1136 may store the above-referenced components and controllers. The processor 1116 may access these as required from the computing device 1136 via the network 1114 that connects the vehicle 1102 and the computing device 1136.

In some examples, the vehicle 1102 may send operational data, including raw or processed sensor data from the sensor system(s) 1106, to one or more computing device(s) 1116 via the network(s) 1114.

In some instances, the perception component 1122 may include functionality to perform object detection, segmentation, and/or classification. In some examples, the perception component 1122 may provide processed sensor data that indicates a presence of an entity that is proximate to the vehicle 1102 and/or a classification of the entity as an entity type (e.g., car, pedestrian, cyclist, animal, traffic light, building, tree, road surface, curb, sidewalk, unknown, etc.). In additional or alternative examples, the perception component 1122 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The sensors of the vehicle 1102 may provide the data relating to the objects in the environment as inputs to a perception component of the vehicle computing device, such as perception component 1122. The perception component may use the data to perform object detection, segmentation, classification, and other data processing to determine characteristics about the objects.

The perception component 1122 may assign identifiers to the objects sensed in the environment to enable the object to be tracked within the environment. The perception component may determine values associated with the objects based on the data received from the sensor, to create a data object for each of the objects. It will be appreciated that, although the objects are physical objects sensed in a real-world environment by the vehicle in this example, in other examples the objects may be objects displayed and used in a simulation, or may be objects identified within video data. Simulation data may be received from a planning component such as planning component 1126 or localization component such as localization component 1120, or from a remote device, such as remote computing device 1136. In some examples, the data may comprise map data received from the maps 1128 or the other components in memory.

The data gathered may be communicated from a starting, first component, e.g., the processors of the vehicle, to a target, second component, such as a different device, different hardware, or different software. The term component is here used to refer to devices, hardware, software, or other features of a computing system to which data may be transferred, and is distinct from the use of component in relation to the software components of the vehicle such as the perception, localization, or planning components. It will be apparent from the context in which the term component is used which of these is being referred to. In some examples, the data may be transferred between two software applications. The software applications may operate within the vehicle computing device and be stored in memory of the vehicle computing device, or may be in remote computing devices. For example, referring to FIG. 11, the data may be transferred from the perception component 1122 to other software components stored in the memory 1118 of the vehicle, such as the localization component 1120 or planning component 1126. In some instances, the data may be transferred from the perception component 1122 to the remote computing device 1136 via the communication connection 1110 and network 1134.

The localization component 1120 may be configured to receive data from the sensor system(s) 1106 to determine a position and/or orientation of the vehicle 1102 (e.g., one or more of an x-, y-, z-position, roll, pitch, or yaw). For example, the localization component 1120 may include and/or request/receive a map 1128 of an environment and may continuously determine a location and/or orientation of the autonomous vehicle within the map 1128.

In at least one example, the planning component 1126 may determine a location of a user based on image data of an environment received from the user using, for example, bags of binary words with image-based features, artificial neural network, and the like. Further, the planning component 1126 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 1102 may stop to pick up a passenger. In at least one example, the planning component 1126 may determine a pickup location based at least in part on determining a user identity (e.g., determined via image recognition or received as an indication from a user device, as discussed herein).

A communication connection 1110 may enable communication between the vehicle 1102 and one or more other local or remote computing device(s). For instance, the communication connection(s) 1110 may facilitate communication with other local computing device(s) on the vehicle 1102 and/or the drive system(s) 1114. Also, the communication connection(s) 1108 may additionally or alternatively allow the vehicle 1102 to communicate with other nearby computing device(s) (e.g., other nearby vehicles, traffic signals, etc.). The communication connection(s) 1110 may additionally or alternatively enable the vehicle 1102 to communicate with a computing device 1136. The computing device 1136 may be at a remote location from the vehicle and the vehicle may communication with the computing device 1136 over a network 1114.

It will be appreciated that data relating to traffic lights in the environment is used as an example in FIGS. 1, 5 and 8 but that data may be transferred between different starting and target components, such as between different vehicle hardware, devices, or systems, between the vehicle and remote hardware, devices, or systems, internally between components of computing devices other than the vehicle, or between different computing devices other than vehicle. For example, within the vehicle 1102, map data may be transferred from the one or more maps 1128 of the vehicle memory 1118 to the localization or planning components 1120, 1126. In some examples, data may be transferred from the planning component 1126 to the system controller 1124 and/or one or more emitters 1108. In some examples, data may be transferred from the system controller 1124 to one or more drive systems 1114.

The maps 1128 may be used by the vehicle 1102 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 228 may be stored based on, for example, a characteristic (e.g., type of entity, time of day, day of week, season of the year, etc.). Storing multiple maps 1128 may have similar memory requirements, but increase the speed at which data in a map may be accessed. As discussed herein, the maps 1128 may further indicate the known locations of traffic lights and may be used by the perception 1122 to identify known traffic lights in measurements captured by the sensor system(s) 1106.

The system controller 1124 may be configured to control steering, propulsion, braking, safety, emitters, communication, and other systems of the vehicle 1102. The system controller(s) 1124 may communicate with and/or control corresponding systems of the drive system(s) 1114 and/or other components of the vehicle 1102. The system controller(s) 1124 may be communicatively coupled to one or more sensors of the vehicle sensor system(s) 1106.

Emitter(s) 1108 may be provided for emitting light and/or sound, and may include interior emitters to communicate with passengers of the vehicle 1102 and/or exterior emitter(s) to communicate with pedestrians or other nearby vehicles.

The drive system(s) 1114 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1114 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 1114. Furthermore, the drive system(s) 1114 may also include one or more communication connection(s) that enable communication by the respective drive system with one or more other local or remote computing device(s).

In some instances, aspects of some, or all, of the components discussed herein may include any models, algorithms, and/or machine learning algorithms. For example, the component(s) in the memory 1120, 1140 may be implemented as a neural network. As can be understood in the context of this disclosure, a neural network may utilize machine learning, which can refer to a broad class of such algorithms in which an output is generated based on learned parameters. Data may be transferred within the models/algorithms, between different models/algorithms, or between the models/algorithms and other components of the vehicle.

Example Clauses

A: An autonomous vehicle comprising: a camera configured to generate one or more images of a first traffic light head and a second traffic light head in the vicinity of the autonomous vehicle; and one or more processors configured to: obtain map data indicating pose information of the first traffic light head; determine an expected pose of the first traffic light head based on the map data; receive the one or more images from the camera; detect, in the one or more images and based at least in part on the expected pose of the first traffic light head, the first and second traffic light heads; determine, based at least in part on the one or more images, respective yaw values for the first and second traffic light heads indicative of a degree that the respective traffic light heads are yawed with respect to a line of sight of the camera or the vehicle; determine, based at least in part on the yaw values, that the first traffic light head is associated with navigation of the vehicle and disregarding a state of the second traffic light head; and generate instructions to control the autonomous vehicle based on a signal of the first traffic light head.

B. The autonomous vehicle according to clause A, further comprising: determining scores for first and second signals on the first traffic light head, the scores indicative of a likelihood that the signals are active; and adjusting the scores based on the yaw value for the first traffic light head, wherein the instructions to control the autonomous vehicle are based on the adjusted scores.

C. The autonomous vehicle according to clauses A or B, further comprising: determining a first distance between the first traffic light head and an expected position of the first traffic light head and a second distance between the second traffic light head and an expected position of the first traffic light head; generating respective scores based on the first and second distances and the yaw values for the first and second traffic light heads; determining, based at least in part on the scores, that the first traffic light head is more associated with the expected position than the second traffic light head; and wherein determining that the first traffic light head is associated with navigation of the vehicle is based at least in part on the traffic light heading being more associated with the expected position than the second traffic light head.

D. The autonomous vehicle according to any of clauses A to C, further comprising: inputting the image data into a convolutional neural network (CNN) trained to classify training image data into a first class indicative of traffic light signals that are yawed, thereby to generate the yaw values.

E. A computer-implemented method comprising: obtaining sensor data via a sensor associated with a vehicle, the sensor data including a traffic light head; determining, based at least in part on the sensor data, a yaw value for the traffic light head indicative of a degree that the traffic light head is yawed with respect to a line of sight of the sensor or the vehicle; determining, based at least in part on the yaw value, an extent that the traffic light head is associated with navigation of the vehicle; and controlling the vehicle based at least in part on the extent that the traffic light head is associated with the navigation of the vehicle.

F. The method according to clause E, further comprising: determining scores indicating the likelihood that first and second signals are active on the traffic light head; determining that the first signal on the traffic light head is active based on the scores; and controlling the vehicle based at least in part on the first signal on the traffic light head.

G. The method according to clauses E or F, wherein the traffic light head is a first traffic light head and the yaw value is a first value, and wherein the sensor data comprises a second traffic light head, the method further comprising: determining, based at least in part on the sensor data, a second yaw value for the second traffic light head indicative of a degree that the second traffic light head is yawed with respect to a line of sight of the sensor or the vehicle; and determining. based at least in part on the second yaw value, an extent that the second traffic light head is associated with navigation of the vehicle.

H. The method according to clause G, further comprising: determining a first score indicative of a likelihood that a signal is active on the first traffic light head; determining a second score indicative of a likelihood that a signal is active on the second traffic light head; adjusting the second score based at least in part on the second yaw value, to generate an adjusted score; and comparing the first score and the adjusted score, further controlling the vehicle based on the comparison of the first and adjusted scores.

I. The method according to any of clauses E to H: obtaining map data indicating position information of the traffic light head; determining an expected position of the traffic light head based on the map data; determining a distance between the traffic light head and the expected position of the first traffic light head; and adjusting the extent to which the first traffic light head is associated with navigation of the vehicle through the junction based on the determined distance.

J. The method according to clause I, wherein the traffic light head is a first traffic light head, the distance is a first distance, and the sensor data comprises a second traffic light head, the method further comprising: determining, based at least in part on the sensor data, a second yaw value for the second traffic light head indicative of a degree that the second traffic light head is yawed with respect to a line of sight of the sensor or the vehicle; determining, based at least in part on the second yaw value, an extent that the second traffic light head is associated with navigation of the vehicle; determining an expected position of the second traffic light head based on the map data; determining a distance between the second traffic light head in the image data and the expected position of the second traffic light head; and adjusting the extent to which the second traffic light head is associated with navigation of the vehicle through the junction based on the determined distance.

K. The method according to any of clauses E to J, wherein the method comprises determining scores indicative of a likelihood that each signal is active on the traffic light head, wherein the scores are weighted based on the extent that the traffic light head is associated with the navigation of the vehicle.

L. The method according to any of clauses E to K, further comprising generating the yaw value by inputting the sensor data into a convolutional neural network (CNN).

M. The method according to clause L, the CNN being trained to classify training sensor data into a plurality of classes, a first of the classes corresponding to traffic light heads at a first range of yaw angles and a second of the classes corresponding to traffic light heads at a second range of yaw angles.

N. The method according to any of clauses E to M, wherein the yaw value indicates that the traffic light head is yawed above a threshold amount of yaw.

O. The method according to clause N, wherein the threshold amount of yaw is between 20 and 30 degrees.

P. The method according to any of clauses E to O, wherein the yaw value indicates an approximate yaw angle of the traffic light head with respect to a line of sight of the sensor or the vehicle.

Q. One or more non-transitory computer-readable media storing instructions executable by one or more processors, wherein the instructions, when executed, cause the one or more processors to perform operations comprising: obtaining sensor data via a sensor associated with a vehicle, the sensor data including a traffic light head; determining, based at least in part on the sensor data, a yaw value for the traffic light head indicative of a degree that the traffic light head is yawed with respect to a line of sight of the sensor or the vehicle; determining, based at least in part on the yaw value, an extent that the traffic light head is associated with navigation of the vehicle; and controlling the vehicle based at least in part on the extent that the traffic light head is associated with the navigation of the vehicle.

R. The one or more non-transitory computer-readable media of clause Q, wherein the instructions cause the one or more processors to perform further operations comprising: determining scores indicating the likelihood that first and second signals are active on the traffic light head; determining that the first signal on the traffic light head is active based on the scores; and basing the generating instructions to control the vehicle on the first signal on the traffic light head.

S. The one or more non-transitory computer-readable media of clauses Q or R, wherein the traffic light head is a first traffic light head and the yaw value is a first value, and wherein the sensor data comprises a second traffic light head, and wherein the instructions cause the one or more processors to perform further operations comprising: determining, based at least in part on the sensor data, a second yaw value for the second traffic light head indicative of a degree that the second traffic light head is yawed with respect to a line of sight of the sensor or the vehicle; and determining, based at least in part on the second yaw value, an extent that the second traffic light head is associated with navigation of the vehicle.

T. The one or more non-transitory computer-readable media of any of clauses Q to S, wherein the instructions cause the one or more processors to perform further operations comprising: obtaining map data indicating position information of the traffic light head; determining an expected position of the traffic light head based on the map data; determining a distance between the traffic light head and the expected position of the first traffic light head; and adjusting the extent to which the first traffic light head is associated with navigation of the vehicle through the junction based on the determined distance.

U. An autonomous vehicle comprising: a camera configured to generate one or more images of a group of traffic light heads in the vicinity of the autonomous vehicle, wherein members of the group of traffic light heads share an active signal at a point in time; and a one or more processors configured to: determine an active signal for each traffic light head of the group of traffic light heads; allocate a vote for each traffic light head based on the determined active signal of the traffic light head, the vote indicating a signal of the traffic light head which is determined to be active; determine a rate equal to a number of votes for a particular signal divided by the total number of traffic light heads in the group of traffic light heads on which the particular signal is displayable; determine that the particular signal of the group of traffic light heads is active based on the rate; and control the autonomous vehicle based at least in part on the particular signal of the group of traffic light heads that is determined to be active.

V. The autonomous vehicle according to clause U, wherein the one or more processors are further configured to weight the rate to prioritize a stop signal, prior to determining the particular signal of the group of traffic light heads is active.

W. The autonomous vehicle according to clauses U or V, wherein the one or more processors are further configured to determine that the rate is above a threshold rate to determine that the particular signal of the group of traffic light heads is active.

X. The autonomous vehicle according to any of clauses U to W, wherein the one or more processors are further configured to: obtain map data indicating known locations of the group of traffic light heads; and identify the traffic light heads in the group of traffic light heads from the image using the known locations.

Y. A computer-implemented method comprising: determining an active signal for a first traffic light head of a group of traffic light heads, wherein members of the group of traffic light heads share an active signal at a point in time; determining an active signal for a second traffic light head of the group of traffic light heads; allocating a first vote for the active signal for the first traffic light head indicating a signal state of the first traffic light head; allocating a second vote for the active signal for the second traffic light head indicating a signal state of the second traffic light head; and determining a signal indicated by the group of traffic light heads based at least in part on the first vote and the second vote.

Z. The method according to clause Y, further comprising: calculating a rate based on a number of votes for a particular signal divided by the total number of traffic light heads in the group of traffic lights on which the particular signal is displayable, and wherein determining the signal indicated by the group of traffic light heads is based on the calculated rate.

AA. The method according to clauses Y or Z, further comprising determining that the calculated rate for the particular signal is above a threshold rate, prior to determining the signal indicated by the group of traffic light heads.

AB. The method according to any of clauses Y to AA, further comprising: receiving a first plurality of indications representing a likelihood that respective signals of the first traffic light head are active; receiving a second plurality of indications representing a likelihood that respective signals of the second traffic light head are active; and basing the determining the active signal for the first traffic light head on the first plurality of indications.

AC. The method according to clause AB, further comprising: weighting the received indications, prior to determining the signal indicated by the group of traffic light heads.

AD. The method according to clause AC, wherein the weighting is to prioritize a stop light signal.

AE. The method according to clauses AC or AD, further comprising: obtaining first data corresponding to an image of the first traffic light head; obtaining second data corresponding to an image of the second traffic light head; determining the first plurality of indications representing a likelihood that respective signals of the group of traffic light heads are active by inputting the data into a convolutional neural network; and determining the second plurality of indications representing a likelihood that respective signals of the group of traffic light heads are active by inputting the data into a convolutional neural network.

AF. The method according to any of clauses Y to AE, further comprising: receiving map data indicating pose information of traffic light heads and an associated group of traffic light heads; and identifying the group of traffic light heads in image data using the pose information.

AG. The method according to any of clauses Y to AF, further comprising: determining a subset of less than all signals displayable by the group of traffic light heads that are relevant to a direction of travel through a junction associated with the traffic light heads, and wherein the active signals for the first and second traffic light heads are in the subset.

AH. The method according to any of clauses Y to AG, further comprising: receiving image data corresponding to an image of the first traffic light head captured by a camera associated with a vehicle; determining, based on the image data, an indication of a yaw angle for the first traffic light head; and weighting the allocated vote for the first traffic light head based on the indication of the yaw angle for the first traffic light head.

AI. The method according to any of clauses Y to AH, further comprising: generating instructions to control a vehicle based on the determined signal indicated by the group of traffic light heads.

AJ. The method according to any of clauses Y to AI, further comprising: receiving image data corresponding to an image of the group of traffic light heads; and identifying the first traffic light head and the second traffic light head from the image data.

AK. One or more non-transitory computer-readable media storing instructions executable by one or more processors, wherein the instructions, when executed, cause the one or more processors to perform operations comprising: determining an active signal for a first traffic light head of a group of traffic light heads, wherein members of the group of traffic light heads share an active signal at a point in time; determining an active signal for a second traffic light head of the group of traffic light heads; allocating a first vote for the active signal for the first traffic light head indicating a signal state of the first traffic light head; allocating a second vote for the active signal for the second traffic light head indicating a signal state of the second traffic light head; and determining a signal indicated by the group of traffic light heads based at least in part on the first vote and the second vote.

AL. The one or more non-transitory computer-readable media of clause AK, wherein the instructions cause the one or more processors to perform further operations comprising: calculating a rate based on a number of votes for a particular signal divided by the total number of traffic light heads in the group of traffic lights on which the particular signal is displayable, and wherein determining the signal indicated by the group of traffic light heads is based on the calculated rate.

AM. The one or more non-transitory computer-readable media of clause AL, wherein the instructions cause the one or more processors to perform further operations comprising determining that the calculated rate for the particular signal is above a threshold rate, prior to determining the signal indicated by the group of traffic light heads.

AN. The one or more non-transitory computer-readable media of any of clauses AK to AM, wherein the instructions cause the one or more processors to perform further operations comprising: receiving a first plurality of indications representing a likelihood that respective signals of the first traffic light head are active; receiving a second plurality of indications representing a likelihood that respective signals of the second traffic light head are active; and basing the determining the active signal for the first traffic light head on the first plurality of indications.

AO. An autonomous vehicle comprising: a camera arranged to generate a plurality of images of a traffic light head in the vicinity of the autonomous vehicle, the plurality of images being captured at respective times; and one or more processors configured to: order the plurality of images into a time-ordered sequence of images; determine, based on the time-ordered sequence of images, a time-ordered sequence of classifications corresponding to a likelihood that a signal of the traffic light head is active at the respective times; input the time-ordered sequence of classifications into a convolutional neural network (CNN) trained to classify a first class corresponding to a likelihood that a traffic light head signal is flashing; determine that the signal is flashing based on the output of the CNN; and control the autonomous vehicle based at least in part on the determination that the signal is flashing.

AP. The autonomous vehicle according to clause AO, wherein the time-ordered sequence of classifications is a time-ordered sequence of first classifications indicating whether a first signal is active, and wherein the one or more processors are further configured to: determine, based on the time-ordered sequence of images, second classifications corresponding to a likelihood that a second signal of the traffic light head is active at the respective times; and aggregate the time-ordered sequence of first and second classifications to generate aggregated data, wherein the aggregated data is input to the CNN.

AQ. The autonomous vehicle according to clauses AO or AP, wherein the one or more processors are further configured to: determine that a time period between a first classification and a second classification, which is immediately next to the first classification in the time-ordered sequence of classifications, is below a threshold; and remove the second classification from the time-ordered sequence of classifications prior to inputting the time-ordered sequence of classifications into the CNN.

AR. The autonomous vehicle according to any of clauses AO to AQ, wherein the processing system is further configured to: determine that a time period between a first classification and a second classification, which is immediately next to the first classification in the time-ordered sequence of classifications, is above a threshold; and prior to inputting the time-ordered sequence of classifications into the CNN, insert a third classification into the time-ordered sequence of classifications, the third classification having an associated time between those of the first and second classifications, and the third classification indicating that the traffic light signal is inactive.

AS. The autonomous vehicle according to any of clauses AO to AR, wherein the camera is a first camera and the plurality of images is a first plurality of images, and the autonomous vehicle further comprises a second camera arranged to generate a second plurality of images of the traffic light head, the second plurality of images being captured at respective times, wherein the time-ordered sequence of images comprises images from both the first plurality of images and the second plurality of images.

AT. A computer-implemented method comprising: collating data representing a time-ordered sequence of classifications indicative of a likelihood that a traffic light signal is active at respective times, thereby to create collated data; generating output data, based on the collated data, using a convolutional neural network (CNN) configured to provide an indication of a likelihood that a traffic light signal is flashing based on an input time-ordered sequence of classifications; and determining that the traffic light signal is flashing based on the output data.

AU. The method according to clause AT, further comprising generating instructions to control a vehicle based on the determination that the traffic light signal is flashing.

AV. The method according to clauses AT or AU, wherein the classifications are probabilities that the traffic light signal is active at the respective times.

AW. The method according to any of clauses AT to AV wherein the data is first data representing a time-ordered sequence of classifications indicative of the likelihood that a first traffic light signal is active, the method further comprising: receiving second data representing a time-ordered sequence of classifications indicative of a likelihood that a second traffic light signal is active; and inputting aggregated first and second data into the CNN, thereby to generate the output data.

AX. The method according to any of clauses AT to AW, further comprising: determining that a time period between a first classification and a second classification, which is contiguous to the first classification in the time-ordered sequence of classifications, is below a threshold; and removing the second classification from the time-ordered sequence of classifications.

AY. The method according to any of clauses AT to AX, further comprising: determining that a time period between a first classification and a second classification, which is contiguous to the first classification in the time-ordered sequence of classifications, is above a threshold; and inserting a third classification into the time-ordered sequence of classifications having an indication associating the third classification to a time between those of the first and second classifications, the third classification indicating that the traffic light signal is inactive.

AZ. The method according to any of clauses AT to AY, further comprising: obtaining image data comprising a plurality of images captured at respective times and respective indications associating the images to the respective times; ordering the plurality of images into a time-ordered sequence of images based on the indications; and generating the time-ordered sequence of classifications by inputting respective ones of the time-ordered sequence of images into a further convolutional neural network trained to classify training image data into a first class corresponding to a likelihood that a traffic light signal is active.

BA. The method according to clause AZ, wherein the image data is obtained from a plurality of sensors.

BB. The method according to any of clauses AT to BA, wherein the traffic light signal corresponds to a stop signal and it is determined that the stop signal is flashing, the method further comprising: receiving an indication that a go signal is active; and prioritizing the determination that the stop light is flashing over a determination that the go signal is active based on the indication.

BC. The method according to any of clauses AT to BB, wherein the time-ordered sequence of classifications corresponds to a time period in which the traffic light signal cycles between active and inactive states at least two times.

BD. The method according to any of clauses AT to BC, wherein the time-ordered sequence of classifications corresponds to a time window of between two and three seconds.

BE. The method according to any of clauses AT to BD, wherein contiguous classifications in the sequence of classifications are between 80 and 120 milliseconds apart.

BF. The method according to any of clauses AT to BE, the CNN being trained to classify training time-ordered sequences of classifications into a class corresponding to a likelihood that a traffic light head signal is flashing.

BG. The method according to any of clauses AT to BF, further comprising: transforming the collated data to the frequency domain, thereby to create collated frequency data, wherein the output data is generated by inputting the collated frequency data into the CNN.

BH. One or more non-transitory computer-readable media storing instructions executable by one or more processors, wherein the instructions, when executed, cause the one or more processors to perform operations comprising: collating data representing a time-ordered sequence of classifications indicative of a likelihood that a traffic light signal is active at respective times, thereby to create collated data; generating output data, based on the collated data, using a convolutional neural network (CNN) arranged to provide an indication of a likelihood that a traffic light signal is flashing based on an input time-ordered sequence of classifications; and determining that the traffic light signal is flashing based on the output data.

While the example clauses described above are described with respect to one particular implementation, it should be understood that, in the context of this document, the content of the example clauses can also be implemented via a method, device, system, computer-readable medium, and/or another implementation. Additionally, any of examples A-T, U-AN and AO-BH may be implemented alone or in combination with any other one or more of the examples A-T, U-AN and AO-BH.

What is claimed is:

1. An autonomous vehicle comprising:
    a camera arranged to generate a plurality of images of a traffic light head in the vicinity of the autonomous vehicle; and
    one or more processors configured to:
        order the plurality of images into a time-ordered sequence of images;
        determine, as part of a first classification operation and based on the time-ordered sequence of images, a time-ordered sequence of classifications, each classification of the time-ordered sequence of classifications corresponding to a likelihood that a signal of the traffic light head is active at a respective time, the time-ordered sequence of classifications associated with a time window;
        input, as part of a second classification operation, the time-ordered sequence of classifications into a convolutional neural network (CNN) trained to classify, based at least in part on the time-ordered sequence of classifications, a first class corresponding to a likelihood that a traffic light head signal is flashing in the time window;
        determine that the signal is flashing based on the output of the CNN; and
        control the autonomous vehicle based at least in part on the determination that the signal is flashing.

2. The autonomous vehicle according to claim 1, wherein the time-ordered sequence of classifications is a time-ordered sequence of first classifications indicating whether a first signal is active, and wherein the one or more processors are further configured to:
    determine, based on the time-ordered sequence of images, second classifications corresponding to a likelihood that a second signal of the traffic light head is active at the respective times; and
    aggregate the time-ordered sequence of first and second classifications to generate aggregated data,
    wherein the aggregated data is input to the CNN.

3. The autonomous vehicle according to claim 1, wherein the one or more processors are further configured to:
    determine that a time period between a first classification and a second classification, which is immediately next to the first classification in the time-ordered sequence of classifications, is below a threshold; and
    remove the second classification from the time-ordered sequence of classifications prior to inputting the time-ordered sequence of classifications into the CNN.

4. The autonomous vehicle according to claim 1, wherein the one or more processors are further configured to:
    determine that a time period between a first classification and a second classification, which is immediately next to the first classification in the time-ordered sequence of classifications, is above a threshold; and
    prior to inputting the time-ordered sequence of classifications into the CNN, insert a third classification into the time-ordered sequence of classifications, the third classification having an associated time between those of the first and second classifications, and the third classification indicating that the traffic light signal is inactive.

5. The autonomous vehicle according to claim 1, wherein the camera is a first camera and the plurality of images is a first plurality of images, and the autonomous vehicle further comprises a second camera arranged to generate a second plurality of images of the traffic light head, the second plurality of images being captured at respective times, wherein the time-ordered sequence of images comprises images from both the first plurality of images and the second plurality of images.

6. A computer-implemented method comprising:

determining, as part of a first classification operation, a time-ordered sequence of classifications, each classification of the time-ordered sequence of classifications indicative of a likelihood that a traffic light signal is active at a respective time;

generating, as part of a second classification operation and based on the time-ordered sequence of classifications, output data using a convolutional neural network (CNN) configured to provide a classification corresponding to a likelihood that a traffic light signal is flashing; and determining that the traffic light signal is flashing based on the output data.

7. The method according to claim 6, further comprising generating instructions to control a vehicle based on the determination that the traffic light signal is flashing.

8. The method according to claim 6, wherein the classifications of the time-ordered sequence of classifications are probabilities that the traffic light signal is active at the respective times.

9. The method according to claim 6, wherein the time-ordered sequence of classifications is a first time-ordered sequence of classifications indicative of the likelihood that a first traffic light signal is active, the method further comprising:

receiving a second time-ordered sequence of classifications indicative of a likelihood that a second traffic light signal is active; and generating the output data based at least in part on the first time-ordered sequence of classifications and the second time-ordered sequence of classifications.

10. The method according to claim 6, further comprising:

determining that a time period between a first classification and a second classification of the time-ordered sequence of classifications, which is contiguous to the first classification in the time-ordered sequence of classifications, is below a threshold; and removing the second classification from the time-ordered sequence of classifications.

11. The method according to claim 6, further comprising:

determining that a time period between a first classification and a second classification of the time-ordered sequence of classifications, which is contiguous to the first classification in the time-ordered sequence of classifications, is above a threshold; and inserting a third classification into the time-ordered sequence of classifications having an indication associating the third classification to a time between those of the first and second classifications, the third classification indicating that the traffic light signal is inactive.

12. The method according to claim 6, further comprising:

obtaining image data comprising a plurality of images captured at respective times and respective indications associating the images to the respective times;

ordering the plurality of images into a time-ordered sequence of images based on the indications; and generating the time-ordered sequence of classifications based on the time-ordered sequence of images.

13. The method according to claim 6, wherein the traffic light signal corresponds to a stop signal and it is determined that the stop signal is flashing, the method further comprising:

receiving an indication that a go signal is active; and prioritizing the determination that the stop light is flashing over a determination that the go signal is active based on the indication.

14. The method according to claim 6, wherein the time-ordered sequence of classifications corresponds to a time period in which the traffic light signal cycles between active and inactive states at least two times.

15. The method according to claim 6, wherein the time-ordered sequence of classifications corresponds to a time window of between two and three seconds.

16. The method according to claim 6, wherein contiguous classifications in the sequence of classifications are between 80 and 120 milliseconds apart.

17. The method according to claim 6, further comprising:

transforming the time-ordered sequence of classifications to the frequency domain, thereby to create collated frequency data, and generating the output data based on the collated frequency data.

18. The method according to claim 6, comprising:

collating data associated with a plurality of traffic light signals into a multi-channel set of classifications; and inputting the multi-channel set of classifications into the CNN, the CNN configured to process multi-channel data in parallel to generate the output data.

19. One or more non-transitory computer-readable media storing instructions executable by one or more processors, wherein the instructions, when executed, cause the one or more processors to perform operations comprising:

determining, as part of a first classification operation, a time-ordered sequence of classifications, each classification of the time-ordered sequence of classifications indicative of a likelihood that a traffic light signal is active at a respective time;

generating, as part of a second classification operation and based on the time-ordered sequence of classifications, output data using a convolutional neural network (CNN) configured to provide a classification corresponding to a likelihood that a traffic light signal is flashing; and determining that the traffic light signal is flashing based on the output data.

\* \* \* \* \*